US008265944B2

(12) United States Patent
Firminger et al.

(10) Patent No.: US 8,265,944 B2
(45) Date of Patent: *Sep. 11, 2012

(54) DETECTING DEVIATION FROM COMPLIANT EXECUTION OF A TEMPLATE

(75) Inventors: Shawn P. Firminger, Redmond, WA (US); Jason Garms, Redmond, WA (US); Roderick A. Hyde, Redmond, WA (US); Edward K.Y. Jung, Bellevue, WA (US); Chris D. Karkanias, Sammamish, WA (US); Eric C. Leuthardt, St. Louis, MO (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC

( * ) Notice: Subject to any disclaimer, the term of this patent is extended or adjusted under 35 U.S.C. 154(b) by 304 days.

This patent is subject to a terminal disclaimer.

(21) Appl. No.: 12/655,075

(22) Filed: Dec. 21, 2009

(65) Prior Publication Data

US 2011/0055142 A1   Mar. 3, 2011

Related U.S. Application Data

(63) Continuation-in-part of application No. 12/592,944, filed on Dec. 3, 2009, and a continuation-in-part of application No. 12/592,946, filed on Dec. 4, 2009, and a continuation-in-part of application No. 12/653,117, filed on Dec. 7, 2009, and a continuation-in-part of application No. 12/653,180, filed on Dec. 8, 2009, and a continuation-in-part of application No. 12/653,387, filed on Dec. 10, 2009, and a continuation-in-part of application No. 12/653,386, filed on Dec. 11, 2009, and a continuation-in-part of application No. 12/653,972, filed on Dec. 17, 2009, and a continuation-in-part of application No. 12/584,489, filed on Sep. 3, 2009.

(51) Int. Cl.
G06Q 10/00 (2012.01)
(52) U.S. Cl. ...................................................... 705/1.1
(58) Field of Classification Search .................. None
See application file for complete search history.

(56) References Cited

U.S. PATENT DOCUMENTS 4,853,854 A   8/1989 Behar et al.
(Continued)

OTHER PUBLICATIONS

Agger, Michael; "Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.

(Continued)

Primary Examiner — Jonathan Ouellette

(57) ABSTRACT

A computationally implemented method includes, but is not limited to: detecting deviation from a compliant execution of a template by an end user, the template designed to facilitate the end user to achieve one or more target outcomes when one or more emulatable aspects included in the template are emulated, the one or more emulatable aspects being based on one or more relevant reported aspects of one or more source users that are relevant to achieving the one or more target outcomes; and executing one or more actions in response to the detecting of the deviation In addition to the foregoing, other method aspects are described in the claims, drawings, and text forming a part of the present disclosure.

44 Claims, 14 Drawing Sheets

U.S. PATENT DOCUMENTS

| | | | |
|---|---|---|---|
| 5,961,446 | A | 10/1999 | Beller et al. |
| 6,338,044 | B1 | 1/2002 | Cook et al. |
| 6,353,447 | B1 | 3/2002 | Truluck et al. |
| 6,842,604 | B1 | 1/2005 | Cook et al. |
| 7,587,368 | B2 | 9/2009 | Felsher |
| 7,668,735 | B2 | 2/2010 | Grace et al. |
| 7,702,685 | B2 | 4/2010 | Shrufi et al. |
| 7,860,852 | B2 | 12/2010 | Brunner et al. |
| 7,908,182 | B1 | 3/2011 | Gupta |
| 7,959,567 | B2 | 6/2011 | Stivoric et al. |
| 8,005,906 | B2 | 8/2011 | Hayashi et al. |
| 2002/0107707 | A1 | 8/2002 | Naparstek et al. |
| 2004/0015337 | A1* | 1/2004 | Thomas et al. ............... 703/11 |
| 2005/0197553 | A1 | 9/2005 | Cooper |
| 2005/0216300 | A1 | 9/2005 | Appelman et al. |
| 2006/0036619 | A1* | 2/2006 | Fuerst et al. ............... 707/100 |
| 2007/0088576 | A1 | 4/2007 | de Beus et al. |
| 2008/0091471 | A1 | 4/2008 | Michon et al. |
| 2008/0288425 | A1* | 11/2008 | Posse et al. ............... 706/12 |
| 2008/0294012 | A1* | 11/2008 | Kurtz et al. ............... 600/300 |
| 2009/0044113 | A1 | 2/2009 | Jones et al. |
| 2009/0070679 | A1 | 3/2009 | Shen et al. |
| 2009/0075242 | A1 | 3/2009 | Schwarzberg et al. |
| 2009/0076335 | A1 | 3/2009 | Schwarzberg et al. |
| 2009/0100469 | A1 | 4/2009 | Conradt et al. |
| 2009/0176526 | A1* | 7/2009 | Altman ............... 455/556.1 |
| 2009/0258710 | A1* | 10/2009 | Quatrochi et al. ............... 463/43 |
| 2009/0271247 | A1 | 10/2009 | Karelin et al. |
| 2009/0292814 | A1 | 11/2009 | Ting et al. |
| 2009/0299990 | A1* | 12/2009 | Setlur et al. ............... 707/5 |
| 2009/0313041 | A1* | 12/2009 | Eder ............... 705/2 |
| 2009/0319288 | A1 | 12/2009 | Slaney et al. |
| 2009/0326981 | A1* | 12/2009 | Karkanias et al. ............... 705/3 |
| 2010/0063993 | A1* | 3/2010 | Higgins et al. ............... 709/203 |
| 2010/0114788 | A1 | 5/2010 | White et al. |
| 2010/0268830 | A1 | 10/2010 | McKee et al. |
| 2010/0281364 | A1* | 11/2010 | Sidman ............... 715/713 |
| 2010/0293247 | A1 | 11/2010 | McKee et al. |
| 2010/0305806 | A1* | 12/2010 | Hawley ............... 701/33 |
| 2011/0022602 | A1 | 1/2011 | Luo et al. |
| 2011/0179161 | A1 | 7/2011 | Guy et al. |
| 2011/0185020 | A1 | 7/2011 | Ramamurthy et al. |
| 2011/0252101 | A1* | 10/2011 | Davis et al. ............... 709/206 |

OTHER PUBLICATIONS

"Self-tracking links to get you started"; The Quantified Self: self knowledge through numbers; printed on Dec. 10, 2010; pp. 1-5; located at: http://quantifiedself.com/self-tracking-links-to-get-you-started/.

U.S. Appl. No. 12/655,582, Firminger et al.
U.S. Appl. No. 12/655,581, Firminger et al.
U.S. Appl. No. 12/655,365, Firminger et al.
U.S. Appl. No. 12/655,250, Firminger et al.
U.S. Appl. No. 12/653,972, Firminger et al.
U.S. Appl. No. 12/653,387, Firminger et al.
U.S. Appl. No. 12/653,386, Firminger et al.
U.S. Appl. No. 12/653,180, Firminger et al.
U.S. Appl. No. 12/653,117, Firminger et al.
U.S. Appl. No. 12/592,946, Firminger et al.
U.S. Appl. No. 12/592,944, Firminger et al.
U.S. Appl. No. 12/592,548, Firminger et al.
U.S. Appl. No. 12/592,544, Firminger et al.
U.S. Appl. No. 12/592,161, Firminger et al.
U.S. Appl. No. 12/592,075, Firminger et al.
U.S. Appl. No. 12/590,841, Firminger et al.
U.S. Appl. No. 12/590,600, Firminger et al.
U.S. Appl. No. 12/590,039, Firminger et al.
U.S. Appl. No. 12/590,027, Firminger et al.
U.S. Appl. No. 12/587,127, Firminger et al.
U.S. Appl. No. 12/587,018, Firminger et al.
U.S. Appl. No. 12/584,653, Firminger et al.
U.S. Appl. No. 12/584,489, Firminger et al.

Diaz, Jesus; "One Day, This Will Be Remembered as the First Real Tricorder"; gizmodo.com; bearing a date of Nov. 12, 2009; pp. 1-2; located at http://gizmodo.com/5403126/one-day-this-will-be-remembered-as-the . . . ; printed on Nov. 25, 2009.

Gross, Daniel; "A Jewish Mother in Your Cell Phone"; Slate; bearing a date of Nov. 10, 2009; pp. 1-3; located at http://www.slate.com/formatdynamics/CleanPrintProxy.aspx?125919 . . . ; printed on Nov. 25, 2009.

Chen, Jason; "You Can Soon Track Your Heart Rate with Your iPhone"; Gizmodo; Bearing a date of Oct. 9, 2009; p. 1; Creative Commons License; located at: http://gizmodo.com/5378340/you-can-soon-track-your-heart-rate-with-your-iphone: printed on Oct. 29, 2009.

"ErgoPR Software: Ergo Pro Computer Fatigue Software reminds you when to stretch and shows you how"; Bioexsystems.com; Bearing dates of 1995-2009; pp. 1-3; BioEx Systems Inc.; located at: http://wvvw.bioexsystems.com/ExerciseBreak.htm; printed on Dec. 17, 2009.

"Exercise Pro Software Active Care Version 5"; Bioexsystems.com; Bearing dates of 1995-2009; pp. 1-4; BioEx Systems Inc.; located at: http://www.bioexsysterns.com/ActiveCare.htm; printed on Dec. 17, 2009.

"Fitbit"; Bearing a date of 2009; pp. 1-2; Fitbit, Inc.; located at: http://www.fitbit.com; printed on Oct. 29, 2009

"Free Exercise Programs—Workout Routines & Weight Loss Diet Plans"; Freetrainers.com; Bearing dates of 2000-2008; pp. 1-2; located at: http://www.freetrainers.com/FT/jsp/index.jsp; printed on Sep. 2, 2009.

Guez, Tomer; "Weight Loss Software, Food Diary, Exercise Tracker, and Medical Diary: 'The Food and Exercise Diary Software Version 6.0'"; Weightlosssoftware.com; Bearing a date of Sep. 2009; pp. 1-17; TG Enterprises, Inc.; located at: http://www.weightloss-software.com/?ti=135&wn=2; printed on Dec. 17, 2009.

"Nutritionmaker Focus: Nutrition Software Motivate—Analyze—Instruct"; Bioexsystems.com; Bearing dates of 1995-2009; pp. 1-4; BioEx Systems Inc.; located at: http://www.bioexsystems.com/NutritionMakerChiro.htm; printed on Dec. 17, 2009.

"Nutrition Tracking Software is Critical for Learning about Foods and Planning Meals"; NutriCoach.net; Bearing a date of Mar. 29, 2006; 6 Total Pages; located at: http://www.nutricoach.net/diet_software.html; printed on Dec. 17, 2009.

"VHI PC—Kits Desktop Edition"; VHIKits.com; pp. 1-2; located http://www.vhikits.com/products/software/PCKitsDesktop.aspx; printed on Dec. 17, 2009.

Wilson, Mark; "Philips DirectLife Turns Exercise Into a Status Bar"; Gizmodo; Bearing a date of Oct. 21, 2009; pp. 1-2; Creative Commons License; located at: http://gizmodo.com/5386577/philips-directlife-turns-exercise-into-a-status-bar; printed on Oct. 29, 2009.

"Your Personalized Development Plan"; Central Michigan University; Bearing a date of 2004; p. 1; located at: http://www.chsbs.cmich.edu/leader_model/dplanintro.htm; printed on Sep. 2, 2009.

Gaonkar, Shravan, et al.; "Micro-Blog: Sharing and Querying Content Through Mobile Phones and Social Participation"; MobiSys '08; Jun. 17-20, 2008; pp. 174-186; ACM.

* cited by examiner

DETECTING DEVIATION FROM COMPLIANT EXECUTION OF A TEMPLATE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/584,489, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 3 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/584,653, entitled PERSONALIZED PLAN DEVELOPMENT, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 8 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,018, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,127, entitled PERSONALIZED PLAN DEVELOPMENT BASED ON OUTCOME IDENTIFICATION, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,027, entitled PERSONALIZED PLAN DEVELOPMENT BASED ON ONE OR MORE REPORTED ASPECTS' ASSOCIATION WITH ONE OR MORE SOURCE USERS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 29 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,039, entitled PERSONALIZED PLAN DEVELOPMENT BASED ON ONE OR MORE REPORTED ASPECTS' ASSOCIATION WITH ONE OR MORE SOURCE USERS, naming Shawn P. Firminger; Jason Gums; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 30 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,600, entitled PERSONALIZED PLAN DEVELOPMENT BASED ON IDENTIFICATION OF ONE OR MORE RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 10 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/590,841, entitled PERSONALIZED PLAN DEVELOPMENT BASED ON IDENTIFICATION OF ONE OR MORE RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 12 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,075, entitled DEVELOPMENT OF PERSONALIZED PLANS BASED ON ACQUISITION OF RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 17 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,161, entitled DEVELOPMENT OF PERSONALIZED PLANS BASED ON ACQUISITION OF RELEVANT REPORTED ASPECTS, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 18 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,544, entitled IDENTIFICATION AND PROVISION OF REPORTED ASPECTS THAT ARE RELEVANT WITH RESPECT TO ACHIEVEMENT OF TARGET OUTCOMES, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 24 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,548, entitled IDENTIFICATION AND PROVISION OF REPORTED ASPECTS THAT ARE RELEVANT WITH RESPECT TO ACHIEVEMENT OF TARGET OUTCOMES, naming Shawn P. Firminger; Jason Garms; Roderick A. Hyde; Edward K. Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 25 Nov. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,944, entitled TEMPLATE DEVELOPMENT BASED ON SENSOR ORIGINATED REPORTED ASPECTS, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 3 Dec. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/592,946, entitled TEMPLATE DEVELOPMENT BASED ON SENSOR ORIGINATED REPORTED ASPECTS, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 4 Dec. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/653,117, entitled SOURCE USER BASED PROVISION OF ONE OR MORE TEMPLATES, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 7 Dec. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/653,180, entitled SOURCE USER BASED PROVISION OF ONE OR MORE TEMPLATES, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 8 Dec. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/653,387, entitled TARGET OUTCOME BASED PROVISION OF ONE OR MORE TEMPLATES, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 10 Dec. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/653,386, entitled TARGET OUTCOME BASED PROVISION OF ONE OR MORE TEMPLATES, naming Shawn P. Firminger; Jason Garms; Roderick A. Hyde; Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 11 Dec. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/653,972, entitled DETECTING DEVIATION FROM COMPLIANT EXECUTION OF A TEMPLATE, naming Shawn P. Firminger; Jason Garms; Roderick A. Hyde;

Edward K.Y. Jung; Chris D. Karkanias; Eric C. Leuthardt; Royce A. Levien; Richard T. Lord; Robert W. Lord; Mark A. Malamud; John D. Rinaldo, Jr.; Clarence T. Tegreene; Kristin M. Tolle; Lowell L. Wood, Jr. as inventors, filed 17 Dec. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to detecting deviation from a compliant execution of a template by an end user, the template designed to facilitate the end user to achieve one or more target outcomes when one or more emulatable aspects included in the template are emulated, the one or more emulatable aspects being based on one or more relevant reported aspects of one or more source users that are relevant to achieving the one or more target outcomes; and executing one or more actions in response to the detecting of the deviation. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for detecting deviation from a compliant execution of a template by an end user, the template designed to facilitate the end user to achieve one or more target outcomes when one or more emulatable aspects included in the template are emulated, the one or more emulatable aspects being based on one or more relevant reported aspects of one or more source users that are relevant to achieving the one or more target outcomes; and means for executing one or more actions in response to the detecting of the deviation. In addition to the foregoing, other system aspects are described in the claims, drawings, and text forming a part of the present disclosure.

A computationally implemented system includes, but is not limited to: circuitry for detecting deviation from a compliant execution of a template by an end user, the template designed to facilitate the end user to achieve one or more target outcomes when one or more emulatable aspects included in the template are emulated, the one or more emulatable aspects being based on one or more relevant reported aspects of one or more source users that are relevant to achieving the one or more target outcomes; and circuitry for executing one or more actions in response to the detecting of the deviation. In addition to the foregoing, other system aspects are described in the claims, drawings, and text forming a part of the present disclosure.

A computer program product including a signal-bearing medium bearing one or more instructions for detecting deviation from a compliant execution of a template by an end user, the template designed to facilitate the end user to achieve one or more target outcomes when one or more emulatable aspects included in the template are emulated, the one or more emulatable aspects being based on one or more relevant reported aspects of one or more source users that are relevant to achieving the one or more target outcomes; and one or more instructions for executing one or more actions in response to the detecting of the deviation. In addition to the foregoing, other computer program product aspects are described in the claims, drawings, and text forming a part of the present disclosure.

A method for executing one or more actions in response to detecting deviation from a compliant execution of a template, the method includes detecting, using a processor, deviation from a compliant execution of a template by an end user, the template designed to facilitate the end user to achieve one or more target outcomes when one or more emulatable aspects included in the template are compliantly emulated, the one or more emulatable aspects being based on one or more relevant reported aspects of one or more source users that are relevant to achieving the one or more target outcomes; and executing one or more actions in response to the detecting of the deviation.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
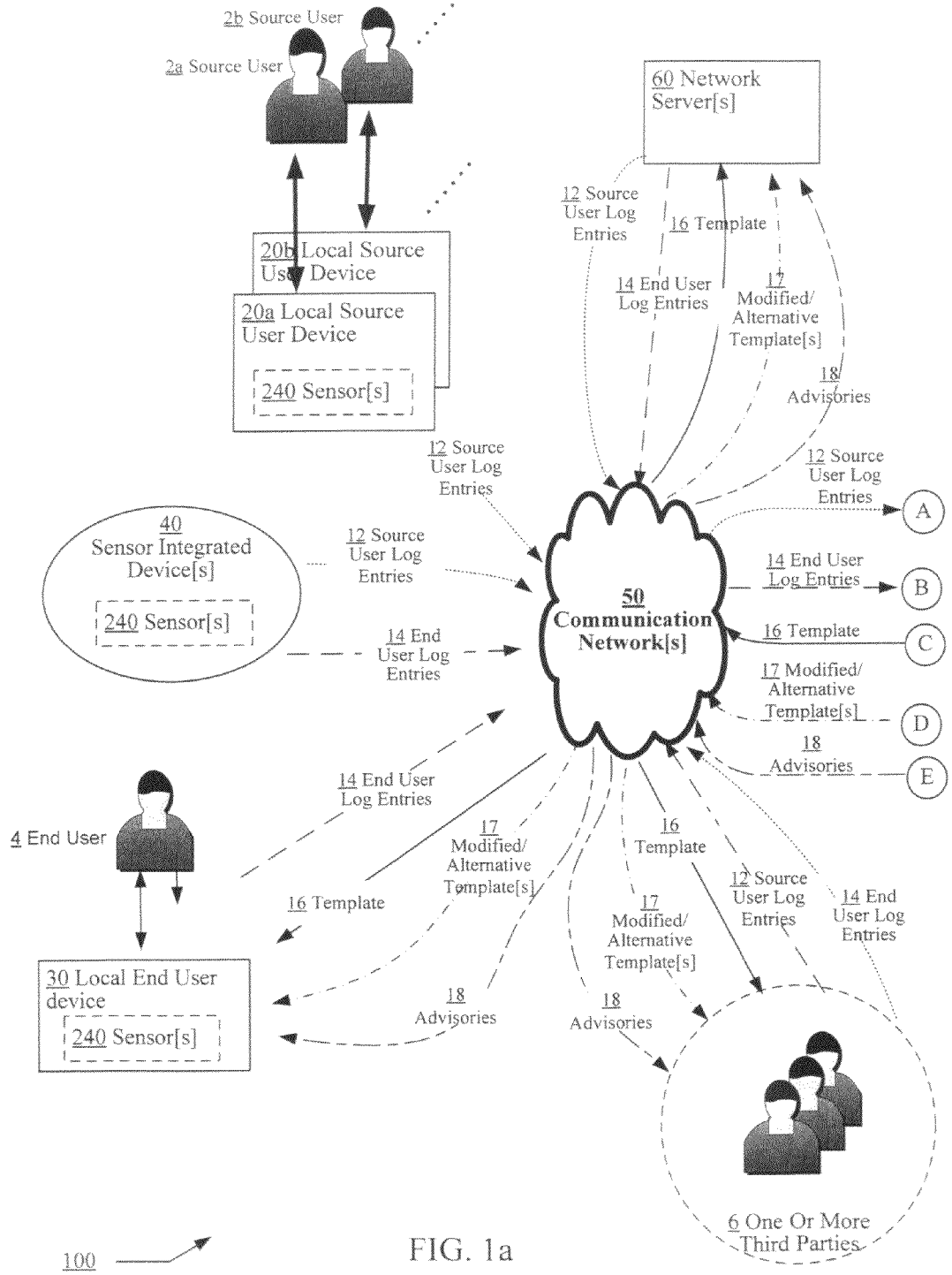
FIGS. 1a and 1b show a high-level block diagram of a Computing Device 10 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that has enjoyed explosive popularity in the computing/communication field is to electronically record one's daily activities, behaviors, thoughts, beliefs, traits, physical or mental states, physical characteristics, and other aspects of the person's everyday life onto an open journal. One place where such open journals are maintained is at social networking sites commonly known as "blogs" where one or more users may report or post every aspect of their daily lives. In brief, an "aspect," as will be referred to herein, may be in reference to any act, behavior, characteristic, user state or status, belief, external events, and so forth, that may be associated with a user (e.g., a person including, for example, a network user such as a blogger or a social networking user). The process of reporting or posting blog entries is commonly referred to as "blogging." A newer type of blogging that has become very popular in recent times is microblogging, otherwise known as "twittering" or "tweeting." In microblogging, each of the microblogs that are posted are typically relatively short posts or entries, usually not more than 140 characters long.

Other types of social networking sites may also allow users to maintain open journals and to allow users to easily update their personal information in real time. Such updates are typically made via, for example, social networking status reports otherwise known simply as "status reports." These social networking sites allow a user to report or post for others to view the latest status or other aspects related to the user.

Another recent tread in social networking is to employ one or more sensors to detect and report on a wide variety of user aspects (i.e., aspects of a user). Examples of sensors that may be used for such purposes vary widely, ranging from well-known devices that can detect and report on various physiological parameters such as heart rate or blood pressure, to sensors that can detect certain user behaviors or activities such as toilet usage. Examples of sensors that may be employed in order to monitor or detect user activities include, for example, accelerometers, pedometers, global positioning systems or GPSs, and so forth. Such devices are already, in fact, being integrated into mobile computing/communication devices such as cellular telephones and smart phones.

Other types of sensors are also being integrated into mobile computing/communication devices such as those that monitor environmental conditions. Examples of such sensors include, for example, those that can measure atmospheric conditions such as air quality levels. In some cases, sensors may be integrated into functional devices such as automobiles, exercise machines, household appliances, and so forth in order to detect and monitor their usage. There are also sensors that are currently available that can even monitor bathroom or toilet usage. All the above described sensors may be configured to provide their collected data through log entries such as entries made through social networking channels (e.g., microblogs, blogs, social networking internet sites, and so forth).

Although a wealth of personal information provided through log entries (e.g., microblogs, status reports, and so forth) are now available through such social networking internet sites (or simply "social networking sites"), it is only recently has there been any effort to exploit such potentially useful data. As blogs, microblogs, and various social networking sites become increasingly popular, personal data collected through such means may be spread across multiple network locations.

One possible way to exploit such personal data is to use such data to develop templates for achieving a variety of target outcomes (e.g., goals) based on the personal data. In brief, a template may be a plan, a program, or a schedule that is designed to facilitate one or more end users to achieve one or more target outcomes when one or more "emulatable aspects" that may be included with the template are emulated. In other words, to use personal data of those (e.g., source users) who have already achieved desirable goals (e.g., target outcomes) to develop templates for others (e.g., end users) to emulate in order to facilitate the others in achieving those goals. Each of the one or more emulatable aspects that may be included in a template may be based on and correspond to one or more reported aspects of one or more source users that may have been reported through, for example, social networking channels (e.g., microblogs, social networking sites, and so forth). An "aspect," in brief may be any behavior, act, mental state, physical state, and so forth that may be associated with a source user. A "reported aspect" is any aspect associated with a source user that may have been reported via, for example, one or more social networking channels or by other means.

There are at least two types of templates that could be developed from personal data obtained through, for example, social networking channels. One type of templates are generic templates that may not be designed for use by any particular end user or a particular group of end users but instead may be designed to be used by any random user in order to achieve one or more target outcomes. The second type of templates, which may be referred to as personalized templates or personalized plans, include those templates that have been personalized for use by a particular end user or users (e.g., a modified version of a generic template that has been modified in order to accommodate the end user's limitations and/or preferences).

In any event, once a template for achieving one or more target outcomes has been developed, the developed template, which could be a generic template or a personalized template, may be provided to one or more end users. An end user may then compliantly execute (i.e., properly execute) the provided template by fully or partially emulating all or some of the one or more emulatable aspects that may be included in the template in order to achieve the one or more target outcomes. Of course, if an end user is unable to compliantly emulate the template, than the one or more target outcomes associated with the template may not be realized.

What constitutes compliant execution of a template will depend on a number of factors including the type of template being emulated and the number and type of emulatable aspects that may be included in the template. For example, in some cases, the compliant execution of a template may require full and complete emulation each of the one or more emulatable aspects that may be included in the template (e.g., if the template requires 45 minutes of running every other day for two months, than to compliantly emulate the template an end user must execute 45 minutes of running every other day for two months). In other cases, however, the compliant execution of a template may merely require that each of the one or more emulatable aspects that may be included in the template be at least substantially emulated or at least only partially emulated (e.g., in the same example above, a compliant execution of the template may be achieved if, for example, on some occasions the end user runs 30 minutes rather than 45 minutes). In still other cases, the compliant execution of a template may only require that a substantial portion of a plurality of emulatable aspects that may be included in the template be fully or substantially emulated (e.g., in the above example, a compliant execution of the template may be achieved even if one or more two days of running are not emulated by the end user).

In various embodiments, methods, systems, circuitry, and computer program products are provided that are designed to, among other things, execute one or more actions in response to detecting deviation from a compliant execution of a template by an end user. For these embodiments, the template may have been originally developed based on selective log entry data of one or more source users provided through, for example, one or more social networking channels (e.g., blogs, microblogs, social networking internet sites, and so forth). In various embodiments, the detecting of the deviation may involve, for example, at least receiving and monitoring log entry data associated with the end user that indicate one or more reported aspects of the end user in order to at least determine whether the one or more emulatable aspects indicated by the template are being at least emulated by the end user. Upon detecting the deviation, a variety of actions may be executed including, for example, presenting one or more advisories, modifying the template and presenting the modified template, or providing (e.g., finding or identifying) and presenting one or more alternative templates. In some embodiments, the methods, systems, circuitry, and computer program products may be implemented by a variety of computing/communication devices including, for example, a network device such as a server (e.g., network servers) or a local client device (e.g., a source user device or an end user device).

As previously described a "template" may be any type of plan, program, or schedule that is designed to facilitate achievement of one or more target outcomes when one or more emulatable aspects included in the template are emulated. Of course, and as briefly described above, in some cases, it may also be possible to achieve one or more target outcomes of a template without fully emulating all of the one or more emulatable aspects that may be included in the template or even failing to emulate a portion of a plurality of emulatable aspects that may be included in the template. The one or more emulatable aspects that may be included in a template may be based on and correspond to one or more reported aspects of one or more source users, who may or may not be the source for the one or more reported aspects. That is, a reported aspect may be reported by any one of a number of different sources including, for example, by the source user (e.g., a microblogger or a social networking user) who is the basis for the reported aspect, by a sensor, or by a third party (e.g., such as another source user).

As briefly indicated above, a template may comprise of one or more emulatable aspects that may be based on reported aspects of, for example, a particular source user. Note that the word "emulatable" as will be repeatedly used herein has no relevant meaning other than to be used in the following description to merely distinguish those aspects (emulatable aspects) that are indicated in a template from other types of aspects (e.g., reported aspects of source users). In accordance with various embodiments, a template may be developed for achieving almost any type of desired outcome (e.g., target outcome) so long as the appropriate data, such as log entry data of source users who have achieved the desired outcome, are available. Examples of the types of templates that could be developed based on log entry data include, for example, those that are designed to facilitate achievement of medical or health related outcomes, those that are designed to facilitate achievement of athletic or gaming outcomes, those that designed to facilitate achievement of particular user states such as mental or social states, those that are designed to facilitate achievement of intellectual or academic outcomes, and so forth.

In some cases, a template may merely indicate or be a collection of one or more emulatable aspects that an end user may emulate in order to achieve one or more target outcomes. In other cases, however, a template may indicate a plurality of emulatable aspects as well as their relationships (e.g., temporal or specific time relationship) with respect to each other. Such a template will be very similar to a schedule or program that indicates when each of the emulatable aspects included in the template should be emulated by the end user with respect to the other emulatable aspects included in the template. For example, if a template is designed to facilitate an end user to shed a certain amount of body weight, it may include a schedule of when and what activities (e.g., go jogging for 30 minutes on day 1, go swimming for 40 minutes on day 2, and so forth) the end user may need to execute in order to achieve the weight loss. Similarly, if the template is designed to, for example, facilitate an end user to achieve a high score for the scholastic aptitude test (SAT), the template may be a schedule of when and what activities (e.g., read a particular book on day 1, work on math problems from a particular math book on day 2, and so forth) the end user may need to execute in order to achieve the high test score for the SAT.

In some instances a template may include one or more emulatable intermediate outcomes that are associated with the one or more target outcomes associated with the template. For example, in the above weight loss example, the template may indicate the amount of weight loss an end user should have achieved (e.g., in order to achieve the target outcome) after emulating, for example, one week, two weeks, or a month of emulatable aspects indicated by the template.

In still other cases, a template may merely be a collection of emulatable aspects that does not define the relationships between the emulatable aspects. For example, a template designed to facilitate an end user to achieve a relaxed state of mind may indicate two unlinked emulatable aspects, "get 8 hours of sleep each night," and "avoid caffeine beverages." Such a template would not necessarily have any indication of relationship between the two emulatable aspects indicated by the template. It should be noted here that an emulatable aspect that may be included into a template may not only be an act or a behavior, but may be a physiological characteristic, a mental state, or any other aspect that may be emulated. For example, a template that is designed to facilitate reducing backaches may include as one of its aspects, a requirement to keep blood pressure below a certain level, which is a physiological state.

In some embodiments, a template may include or be linked to other information other than emulatable aspects. For example, in some instances, a template may include or be associated with a particular source user and/or with a particular target outcome. Other information may also be included with or be associated with a template as will be further described herein.

In order to facilitate understanding of the various concepts to be described herein, an introduction to the meaning of certain words and phrases to be used in the following discussion will now be provided. In brief, and as will be further described herein, an "aspect" may be any occurrence of any behavior, act, belief, characteristic, state, external event, or any other facet associated with a source user or a group of source users. A "source user" may be any person, such as a microblogger or a social networking user, who may be the basis for one or more reported aspects. Note that a source user may not necessarily have to be the source for the one or more reported aspects that are related to the source user since reported aspects that are associated with a particular source user may be provided by other source users or by sensors.

A "reported aspect" may be any aspect associated with or related to a source user that has been reported by, for example, the source user, by one or more sensors, or by one or more third parties (e.g., other source users). In some instances, such a reported aspect may be reported in the form of a log entry such as a microblog entry, a status report, or a journal entry.

A "target outcome" may be any type of desirable goal or result that may be sought by, for example, an end user. Examples of target outcomes include, for example, health-related outcomes such as weight loss or improved cardiovascular conditioning, athletic outcomes such as developing a particular athletic skill including being able to pitch a curve ball or achieving a particular golf handicap, physiological outcomes such as reduced blood pressure or blood glucose levels, social outcomes such as obtaining membership into an elite social club or attaining a particular social status, mental state outcomes such as achieving certain level of calmness or happiness, interpersonal or relational outcomes such as having lots of friends or developing skill to make friends, employment outcomes such as being promoted or developing certain work skills, academic or intellectual outcomes, and so forth.

An "end user" may be any person, for example, who executes a template in order to achieve one or more target outcomes. As briefly described above, a "source user" may be any person who may be the basis for one or more reported aspects. Note that although in most cases, a source user will be an actual (real) person who may be the basis for one or more reported aspects, in other cases, however, a source user may be a fictional person such as a composite of multiple "actual" source users. For example, reported aspects indicating actual aspects of a plurality of actual source users may be compiled and processed (e.g., normalized or averaged out) in order to create a fictional source user.

Figure 1B:
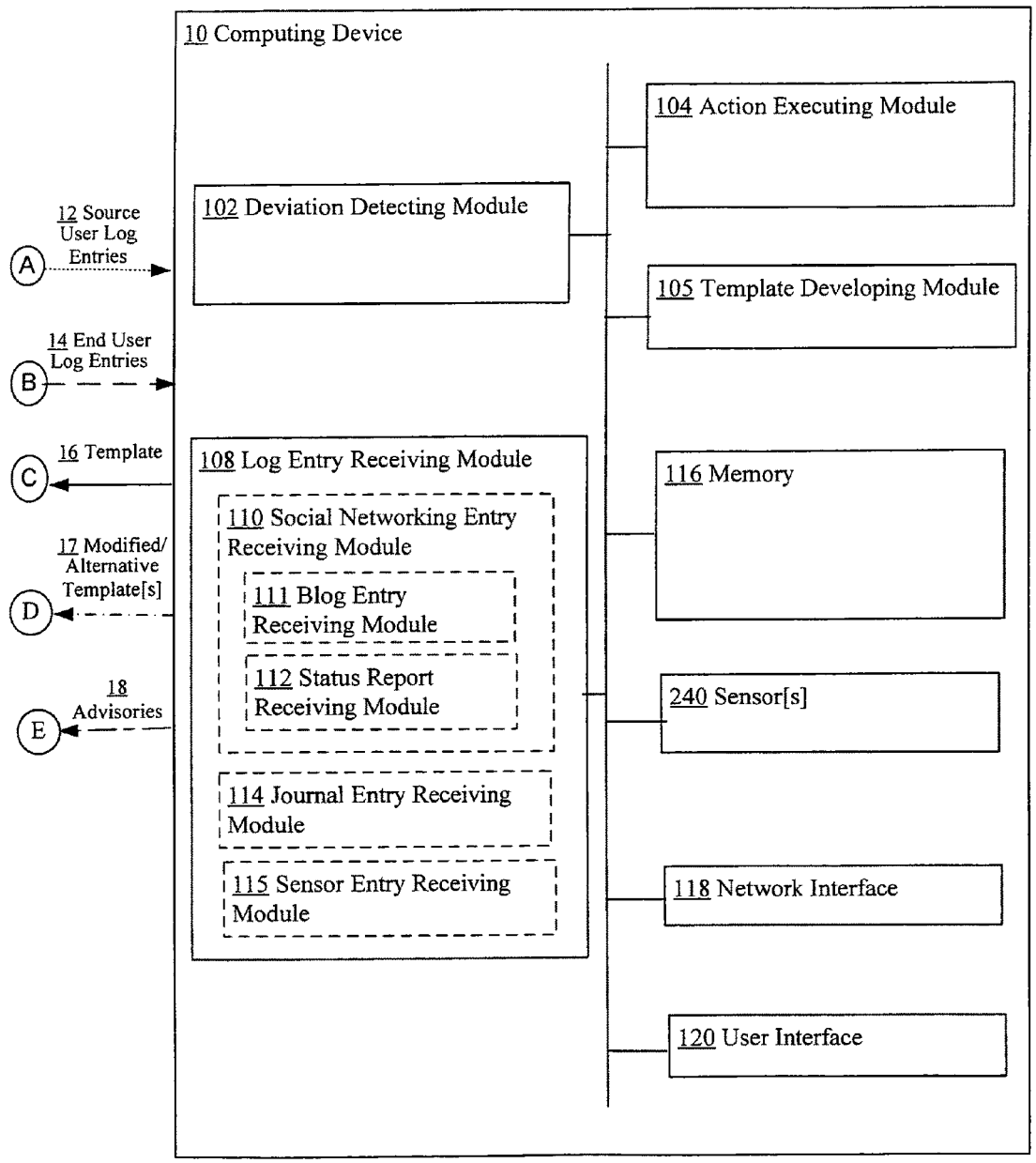

Turning now to FIGS. 1a, and 1b illustrating an example environment in which the methods, systems, circuitry, and computer program products in accordance with various embodiments may be implemented by a computing device 10. In particular, the methods, systems, circuitry, and computer program products may be implemented at any network device including at a peer-to-peer network component device. In some embodiments, the computing device 10 may be a server such as one of the one or more network servers 60 illustrated in FIG. 1a. Alternatively, the computing device 10 may be a source user device such as one of the local source user devices 20* illustrated in FIG. 1a. In still other embodiments, the computing device 10 may be an end user device such as the local end user device 30 illustrated in FIG. 1a. Note that in the following, "*" represents a wildcard. Thus, references in the following description to, for example, "a source user 2*" may be in reference to a source user 2a, a source user 2b, and so forth.

Note further that for ease of understanding and explanation, the computing device 10 of the exemplary environment 100 of FIGS. 1a and 1b in the following discussion will be generally described operating as a server (e.g., server embodiment) rather than as an end user device or as a source user device. Further, although the following discussion related to the exemplary environment 100 of FIG. 1a and 1b assumes that the computing device 10 is a server, the following discussion will, for the most part, be applicable even if the computing device 10 were operating as an end user device (e.g., local end user device 30*) or as a source user device (e.g., local source user device 20*) with certain obvious exceptions (e.g., if the computing device 10 is an end user device or a source user device rather than a server, the computing device 10 may communicate with an end user 4 or a source user 2* directly through a user interface 120 rather than indirectly through a communication network 50 as may be the case when the computing device 10 is a server). In some embodiments, the computing device 10 may operate via a web 1.0 or web 2.0 construct.

Referring back to FIGS. 1a and 1b, and as previously indicated, the computing device 10 may be a network device such as a server (e.g., a network server 60) that is designed to communicate with other network devices. For example, the computing device 10 may communicate with one or more source users 2* (e.g., source user 2a, source user 2b, and so forth) through one or more local source user devices 20* (e.g., local source user device 20a, local source user device 20b, and so forth), with at least one end user 4 through at least one local end user device 30, with one or more sensor integrated devices 40 (e.g., a transportation vehicle such as a car, an exercise machine, or any other type of functional device that may have an integrated sensor designed to sense, for example, usage), with one or more network servers 60, and/or with one or more third parties 6 (e.g., one or more content providers, one or more network service providers, and/or one or more other end users 4) via one or more communication networks 50. In some implementations, the one or more communication networks 50 may include one or more wireless networks and/or one or more wired networks including, for example, at least one of a local area network (LAN), a wireless local area network (WLAN), personal area network (PAN), Worldwide Interoperability for Microwave Access (WiMAX), public switched telephone network (PTSN), general packet radio service (GPRS), cellular networks, and/or other types of wireless and/or wired networks.

In some implementations, the computing device 10 may be designed to develop at least one template 16 that is designed to facilitate achievement of one or more target outcomes when one or more emulatable aspects included in the template 16 are emulated. The development of the template 16 may be based on one or more source user log entries 12 that may indicate one or more reported aspects associated with one or more source users 2* and that may be received from a variety of sources including for example, one or more network servers 60, one or more local source user devices 20*, one or more sensor integrated devices 40, and/or one or more third parties 6. In some cases, such log entries may be in the form of, for example, social networking entries such as blog entries, status reports, and so forth. After receiving the one or more source user log entries 12 indicating the one or more reported aspects associated with the one or more source user 2*, the template 16 may be developed by at least identifying from the one or more reported aspects one or more relevant reported aspects that are relevant to achieving the one or more target outcomes. Once the relevant reported aspects have been identified, the template 16 may be developed (e.g., created)

by at least including into the template 16 one or more emulatable aspects that correspond to the one or more relevant reported aspects. In some cases, the development of the template 16 may further include defining in the template 16 the relationships (e.g., temporal or specific time relationships) between a plurality of emulatable aspects that may be included in the template 16.

After developing the template 16, the template 16 may be provided to at least one end user 4, to one or more network servers 60, to one or more third parties 6, or to one or more source users 2* via one or more communication networks 50. In embodiments in which the computing device 10 is a local client device such as local end user device 30 or a local source user device 20*, the template 16 may be presented via a user interface 120.

In alternative implementations, however, the template 16 may not be developed at the computing device 10. Instead, the template 16 may be developed at a remote network site (e.g., local source user device 20*) and provided to the computing device 10 via, for example, one or more communication networks 50.

In various implementations, after developing or being provided with the template 16, the computer device 10 may be designed to monitor the progress of an end user 4 in compliantly executing the template 16 in order to achieve the one or more target outcomes. In other words, the computing device 10 may be designed to at least detect deviation from a compliant execution of the template 16. In order to monitor the progress of the end user 4, the computing device 10 may receive one or more end user log entries 14 (e.g., microblogs, status reports, journal entries, sensor entries) associated with the end user 4 from one or more sources (e.g., local end user device 30, one or more sensor integrated devices 40, one or more third parties 6 such as other end users 4 and/or one or more network servers 60). The one or more end user log entries 14 to be received may indicate one or more reported aspects of the end user 4 when, for example, the template 16 is being executed. Note that in those embodiments in which the computing device 10 is an end user device (e.g., local end user device 30), the one or more log entries may be received directly from the end user 4 via the user interface 120.

In order to determine deviation from the compliant execution of the template 16 by the end user 4, the one or more reported aspects indicated by the one or more received end user log entries 14 may be compared to the one or more emulatable aspects of the template 16. By making the comparison, a determination may be made as to whether one or more deviations from the one or more emulatable aspects have occurred. By at least determining that one or more deviations from the one or more emulatable aspects of the template 16 have occurred, a determination may be made that a deviation from the compliant emulation of the template 16 has also occurred.

Note that in some cases, not all of the detected deviations from the one or more emulatable aspects of the template 16 may result in a determination that a deviation from the compliant emulation of the template 16 by the end user 4 has occurred. For example, suppose one of the emulatable aspects of the template 16 requires the end user 4 to jog for 45 minutes. If the end user 4 is reported as jogging for only 30 minutes instead of the 45 minutes as indicated by the template 16 then such a deviation from an emulatable aspect may not result in the conclusion that a deviation from the compliant execution of the template 16 has occurred since such a deviation may not be considered significant enough to change the outcome of executing the template 16 (e.g., achieving a target outcome). Thus, in some cases, there may be an additional operation after the operation for detecting one or more deviations from the one or more emulatable aspects that requires checking to see if the detected deviations are "significant" deviations. Of course which types of deviations will be considered significant may depend on a number of factors including the type of emulatable aspects that were not at least fully emulated and the type of template 16 being executed. Alternatively, those deviations from the one or more emulatable aspects of the template 16 that are determined to be not significant may be simply ignored and may simply not be considered as a "deviation."

In any event, after determining or detecting a deviation from the compliant execution of the template 16, the computing device 10 may be designed to execute one or more actions. Various types of actions may be executed by the computing device 10 in various alternative implementations. For example, in some implementations, upon detecting the deviation from the compliant execution of the template 16, the computing device 10 may be designed to present one or more advisories. In some cases, the one or more advisories, which may be transmitted to the end user 4 or a third party 6, may include an alert or warning regarding the deviation. In other cases, the one or more advisories may indicate a recommendation for a future course of action (e.g., switching to a new or a different template).

Another action that may be taken is to modify the template 16 in order to accommodate the detected deviation. After modifying the template 16, the modified template 17 (indicated in FIGS. 1a and 1b as one or more modified/alternative templates 17) may be presented to, for example, the end user 4 and/or one or more third parties 6 via the one or more communication networks 50 and/or via the user interface 120. Another action that may be executed is to provide (e.g., identify, find, acquire, or retrieve) one or more alternative templates 17 ((indicated in FIGS. 1a and 1b as one or more modified/alternative templates 17) that may be completely distinct from the template 16. In some cases, the one or more alternative templates 17 that are provided may accommodate the detected deviation and may be designed to achieve the same one or more target outcomes of the template 16.

In various embodiments, the computing device 10, as previously indicated, may be a server (e.g., one of the one or more network servers 60) that may be located at a single network site, located across multiple network sites, or may be a conglomeration of servers located at multiple network sites. In embodiments in which the computing device 10 is a source user device (e.g., local source user device 20*) or an end user device (e.g., local end user device 30) rather than a network server 60, the computing device 10 may be any one of a wide range of mobile or stationary computing/communication devices including, for example, a laptop, a desktop, a workstation, a cellular telephone, a personal digital assistant (PDA), a Smartphone, a web tablet such as a Netbook, and so forth.

Referring back to the exemplary environment 100 of FIGS. 1a and 1b, the one or more sensor integrated devices 40 of the exemplary environment 100 of FIGS. 1a and 1b may directly communicate with the one or more communication networks 50 in various embodiments. Alternatively, the one or more sensor integrated devices 40 may indirectly communicate with the one or more communication networks 50 via the one or more local source user devices 20* (e.g., via, for example, personal area network or PAN) or via the local end user device 30. In various embodiments, a sensor integrated device 40 may be a variety of functional devices that may comprise of one or more sensors 240 and that may be operated or used by a source user 2*. Examples of such devices include, for example, a transportation vehicle (e.g., automobile, a motorcycle, a boat, a plane, and so forth), an exercise machine (e.g., a treadmill), a household appliance (e.g., television set), and so forth.

As will be further described herein, the one or more sensors 240, which may also be included in the one or more local source user devices 20*, the local end user device 30, and/or the computing device 10, may include any type of sensors 240 that can sense one or more aspects of a source user 2* or an end user 4. Examples of such sensors 240 include, for example, sensors 240 that can sense various physical characteristics of a source user 2* (e.g., heart rate sensor or blood pressure sensor), sensors 240 that can sense activities of a source user 2* (e.g., a pedometer, an accelerometer, and so forth), sensors 240 that can sense environment conditions (e.g., air quality sensors), sensors 240 that can sense the location of a source user 2* (e.g., global positioning system or GPS), sensors 240 that can provide physiological data that may be processed in order to determine inferred mental states of users, and so forth.

Each of the one or more local source user devices 20* and the local end user device 30 (as well as the computing device 10 in embodiments in which the computing device 10 is an end user device or a source user device) may be any one of a variety of computing/communication devices including, for example, a cellular phone, a personal digital assistant (PDA), a laptop, a desktop, or other types of computing/communication devices. In some embodiments, the one or more local source user devices 20* and/or the local end user device 30 (as well as the computing device 10 in some embodiments) may be a handheld device such as a cellular telephone, a Smartphone, a Mobile Internet Device (MID), an Ultra Mobile Personal Computer (UMPC), a convergent device such as a personal digital assistant (PDA), and so forth. Alternatively, such local client devices (e.g., local source user device 20* and/or local end user device 30) may be a laptop, a desktop, a workstation, a web tablet such as a Netbook, or other types of devices that may not be a handheld device in various alternative implementations.

Figure 2A:
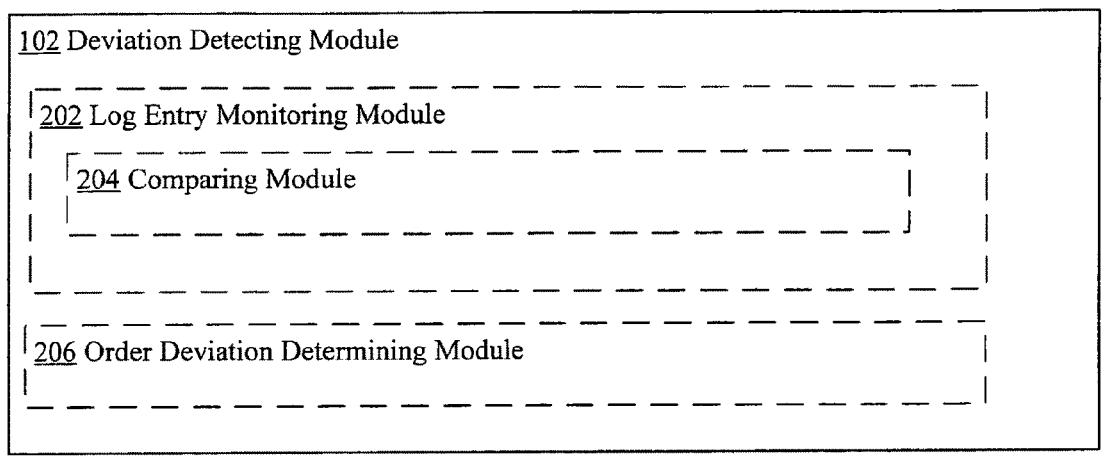
FIG. 2a shows another perspective of the Deviation Detecting Module 102 of the Computing Device 10 of FIG. 1b.
Figure 2B:
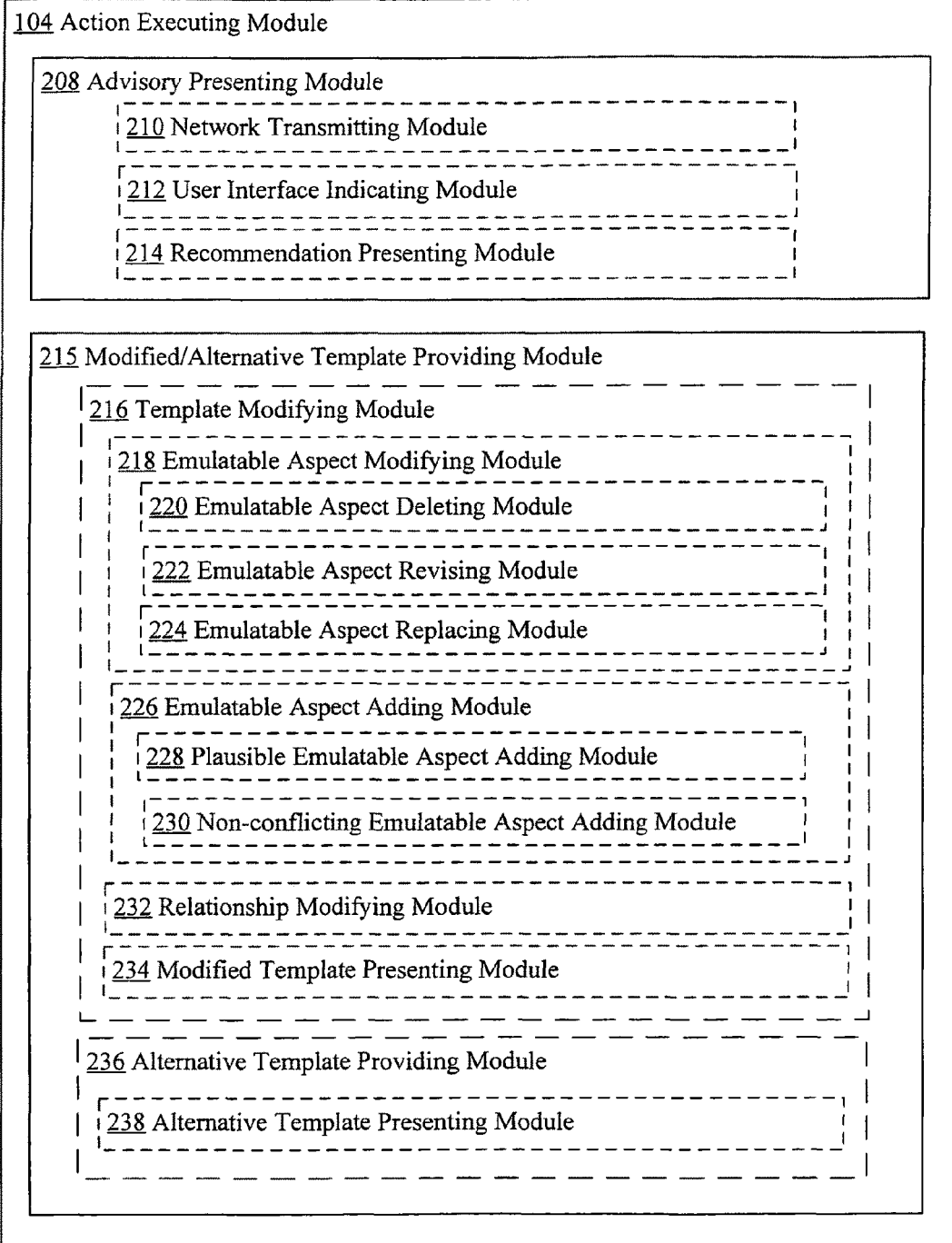
FIG. 2b shows another perspective of the Action Executing Module 104 of the Computing Device 10 of FIG. 1b.

The computing device 10 as illustrated in FIG. 1b may include one or more modules, sub-modules, and various other components. As shown, the computing device 10 may include at least a deviation detecting module 102 (which may further include one or more sub-modules as illustrated in FIG. 2a) and an action executing module 104 (which may also include one or more sub-modules as illustrated in FIG. 2b). The deviation detecting module 102 may be particularly configured to, among other things, detect deviation from a compliant execution by an end user 4 of a template 16 that is designed to facilitate the end user 4 to achieve one or more target outcomes when one or more emulatable aspects included in the template 16 are emulated, the one or more emulatable aspects being based on one or more relevant reported aspects of one or more source users 2* that are relevant to achieving the one or more target outcomes. In contrast, the action executing module 104 may be particularly configured to, among other things, execute in response to the detection of the deviation one or more actions.

In various implementations, the computing device 10 may further include a template developing module 105 and a memory 116. The template developing module 105 may be particularly configured to develop one or more templates 16 based on relevant reported aspects of one or more source user 2* that have been determined to be relevant for achieving one or more target outcomes. The memory 116, in various implementations may store a plurality of templates including the template 16 and/or the one or more modified/alternative templates 17. In some implementations, the memory 116 may store one or more applications (e.g., a text messaging application, an instant messaging application, an email application, a social networking application, a voice recognition system, a Web 1.0 application, and/or Web 2.0 application to facilitate in communicating via, for example, the World Wide Web). The memory 116 may comprise of one or more of a mass storage device, a read-only memory (ROM), a programmable read-only memory (PROM), an erasable programmable read-only memory (EPROM), a cache memory such as random access memory (RAM), a flash memory, a synchronous random access memory (SRAM), a dynamic random access memory (DRAM), and/or other types of memory devices.

The computing device 10 may also include, in various implementations, a network interface 118 (e.g., a network interface card or NIC), a user interface 120 (e.g., a display monitor, a touchscreen, a microphone, a speaker, a mouse, and so forth), and/or one or more sensors 240 that are designed to measure or sense one or more user aspects. Examples of sensors 240 include, for example, devices that are design to sense user activities such as pedometers and accelerometers, devices that are designed to sense physiological characteristics such as heart rate monitors or blood glucose monitor, devices that are designed to sense environmental conditions such as sensors 240 for measuring air quality, devices that are designed to detect user location such as GPS, and so forth. In some implementations, the presence or absence of some of these modules and components of computing device 10 may depend on, for example, whether the computing device 10 is a server, an end user device, or a source user device. For example, if the computing device 10 is a server, then the computing device 10 may not include a user interface 120.

In some implementations, the computing device 10 may include a log entry receiving module 108 that is particularly configured to, among other things, receive one or more log entries associated with users (e.g., an end user 4 and/or one or more source users 2*). Such log entries (e.g., end user log entries 14 and source user log entries 12) may be received from a variety of sources including, for example, a local end user device 30, one or more local source user devices 20*, one or more third parties 6, one or more sensor integrated devices 40, and/or one or more network servers 60. In embodiments in which the computing device 10 is a client device such as an end user device or a source user device, the log entries may be directly received from an end user 4 or from one or more source users 2* via the user interface 120.

In various embodiments, the log entry receiving module 108 may include a social networking entry receiving module 110 that may be particularly configured to receive social networking entries associated with the end user 4 and/or associated with one or more source users 2*. The social networking entry reception module 110 may further include a blog entry receiving module 111 configured to receive blog entries (e.g. microblog entries) and/or a status report reception module 112 configured to receive social networking status reports. In some implementations, the log entry receiving module 108 may include a journal entry receiving module 114 that is configured to receive journal entries from the end user 4, from the one or more source users 2*, and/or from one or more third parties 6. In some implementations, the log entry receiving module 108 may include a sensor entry receiving module 115 that is configured to receive sensor generated entries from one or more sensors 240.

FIG. 2a illustrates particular implementations of the deviation detecting module 102. The deviation detecting module 102 may include a log entry monitoring module 202 (which may further include a comparing module 204) and an order deviation determining module 206. A more detailed discussion of these modules and sub-modules of the deviation detecting module 102 will be provided with respect to the processes and operation to be described herein.

FIG. 2b illustrates particular implementations of the action executing module 104 of the computing device 10 of FIG. 1b. As illustrated, the action executing module 104 may include an advisory presenting module 208 (which may further include a network transmitting module 210, a user interface indicating module 212, and/or a recommendation presenting module 214) and/or a modified/alternative template providing module 215. As further illustrated the modified/alternative template providing module 215 may further include a template modifying module 216 and/or an alternative template providing module 236 (which may further include an alternative template presenting module 238). In some implementations, the template modifying module 216 may further include an emulatable aspect modifying module 218 (which may further include an emulatable aspect deleting module 220, an emulatable aspect revising module 222, and/or an emulatable aspect replacing module 224), an emulatable aspect adding module 226 (which may further include a plausible emulatable aspect adding module 228 and/or a non-conflicting emulatable aspect adding module 230), a relationship modifying module 232, and/or a modified template presenting module 234. A more detailed discussion of these modules and sub-modules of the action executing module 104 will be provided with respect to the processes and operation to be described herein.

Referring back to the computing device 10 of FIG. 1b, the various modules (e.g., the deviation detecting module 102, the action executing module 104, and so forth) along with their sub-modules included in the computing device 10 may be implemented using hardware, software, firmware, or any combination thereof. For example, in some implementations, the deviation detecting module 102 and/or the action executing module 104 may be implemented with a processor 602 (e.g., microprocessor, controller, and so forth) executing computer readable instructions 604 (e.g., computer program product) stored in a storage medium 606 (e.g., volatile or non-volatile memory) such as a signal-bearing medium as depicted in the computing device 10 of FIG. 6. Alternatively, hardware such as application specific integrated circuit (ASIC) may be employed in order to implement such modules in some alternative implementations.

Figure 3:
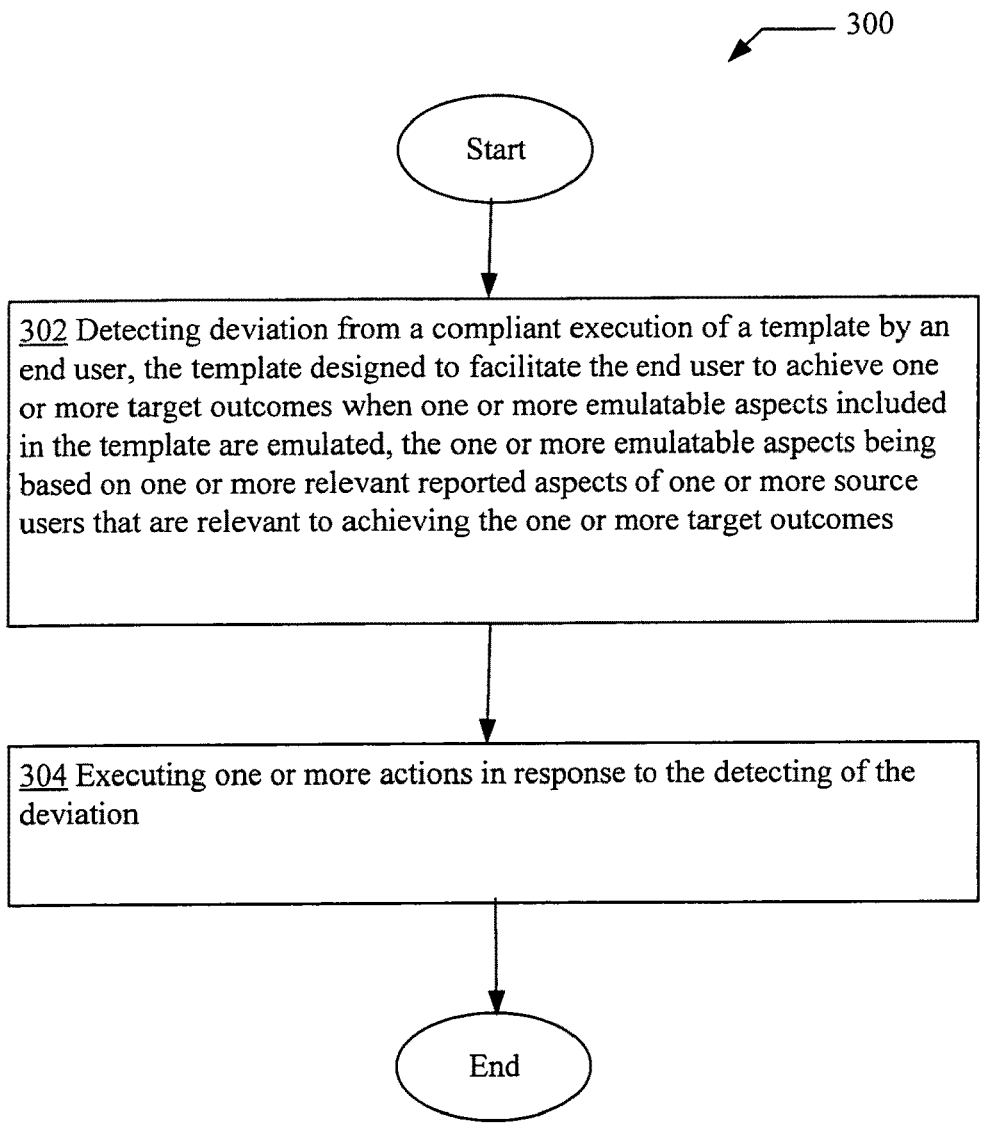
FIG. 3 is a high-level logic flowchart of a process.

A more detailed discussion relating to the functional aspects of the computing device 10 of FIG. 1b and its components will now be provided with respect to the processes and operations to be described herein. FIG. 3 illustrates an operational flow 300 representing example operations directed to, among other things, detection of deviation from a compliant execution of a template by an end user 4, and executing one or more actions in response to the detection of the deviation.

In FIG. 3 and in the following figures that include various examples of operational flows, discussions and explanations of the operational flows will be provided with respect to the exemplary environment 100 described above as illustrated in FIGS. 1a and 1b, and/or with respect to other examples (e.g., as provided in FIGS. 2a and 2b) and contexts. However, it should be understood that the operational flows may be executed in a number of other environments and contexts, and/or in modified versions of FIGS. 1a, 1b, 2a, and 2b. Also, although the various operational flows are presented in the sequence(s) illustrated, it should be understood that the various operations may be performed in other orders other than those which are illustrated, or may be performed concurrently.

Further, in FIG. 3 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 300 may move to a deviation detecting operation 302 for detecting deviation from a compliant execution of a template by an end user, the template designed to facilitate the end user to achieve one or more target outcomes when one or more emulatable aspects included in the template are emulated, the one or more emulatable aspects being based on one or more relevant reported aspects of one or more source users that are relevant to achieving the one or more target outcomes. For instance, and as an illustration, the deviation detecting module 102 of the computing device 10 of FIG. 1b detecting deviation from a compliant execution of a template 16 by an end user 4, the template 16 designed to facilitate the end user 4 to achieve one or more target outcomes 16 (e.g., health or medical outcomes, mental state outcomes, academic or intellectual outcomes, and so forth) when one or more emulatable aspects (e.g., user acts or behaviors) included in the template 16 are emulated, the one or more emulatable aspects being based on one or more relevant reported aspects of one or more source users 2* that are relevant to achieving the one or more target outcomes.

In addition to the deviation detecting operation 302, operational flow 300 may also include an action executing operation 304 for executing one or more actions in response to the detecting of the deviation. For instance, the action executing module 104 of the computing device 10 executing one or more actions (e.g., presenting advisories, presenting modified and/or an alternative templates 17, and so forth) in response to the detecting of the deviation. As will be further described herein, both the deviation detecting operation 302 and the action executing operation 304 of FIG. 3 may be executed in a number of different ways in various alternative implementations.

Figure 4A:
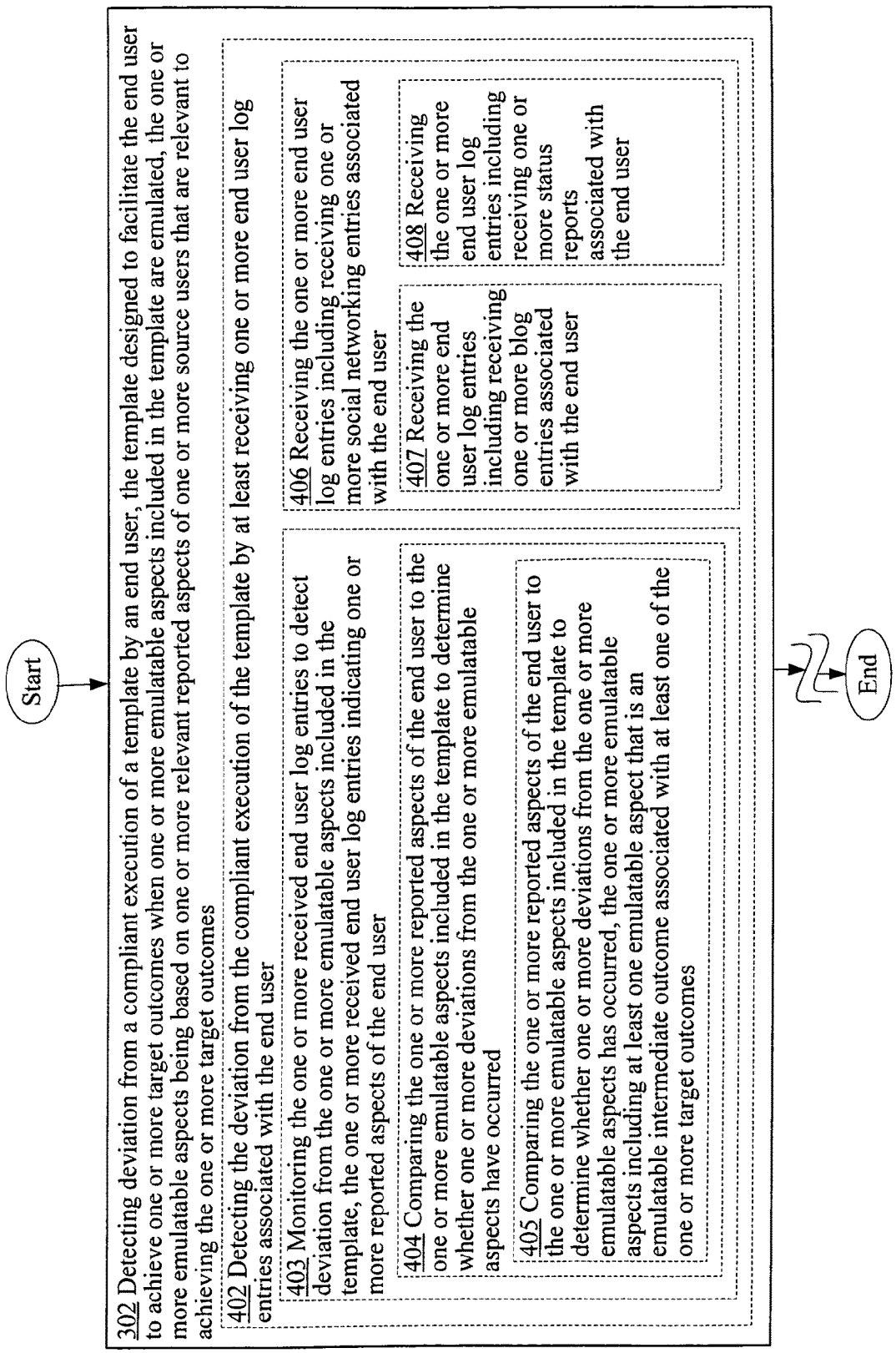
FIG. 4a is a high-level logic flowchart of a process depicting alternate implementations of the deviation detecting operation 302 of FIG. 3.

For example, FIGS. 4a, 4b, 4c and 4d illustrate the various ways that the deviation detecting operation 302 of FIG. 3 may be executed in various alternative implementations. For instance, the deviation from the compliant execution of the template 16 by the end user 4 to be detected through the deviation detecting operation 302 may be performed in a variety of different ways. For example, in some implementations, the deviation detecting operation 302 of FIG. 3 may include an operation 402 for detecting the deviation from the compliant execution of the template by at least receiving one or more end user log entries associated with the end user as depicted in FIG. 4a. For instance, the deviation detecting module 102 including the log entry receiving module 108 (see FIG. 1b) of the computing device 10 detecting the deviation from the compliant execution of the template 16 when the log entry receiving module 108 at least receives one or more end user log entries 14 associated with the end user 4.

In some implementations, operation 402 may further include an operation 403 for monitoring the one or more received end user log entries to detect deviation from the one or more emulatable aspects included in the template, the one or more received end user log entries indicating one or more reported aspects of the end user as depicted in FIG. 4a. For instance, the log entry monitoring module 202 (see FIG. 2a) of the computing device 10 monitoring the one or more received end user log entries 14 to detect deviation from the one or more emulatable aspects included in the template 16, the one or more received end user log entries 14 indicating one or more reported aspects of the end user 4.

In various implementations, operation 403 may further include an operation 404 for comparing the one or more reported aspects of the end user to the one or more emulatable aspects included in the template to determine whether one or more deviations from the one or more emulatable aspects have occurred as depicted in FIG. 4a. For instance, the comparing module 204 (see FIG. 2a) of the computing device 10 comparing the one or more reported aspects of the end user 4 (as indicated by the end user log entries 14) to the one or more emulatable aspects included in the template 16 to determine whether one or more deviations from the one or more emulatable aspects has occurred.

Operation 404, in turn, may further include an operation 405 for comparing the one or more reported aspects of the end user to the one or more emulatable aspects included in the template to determine whether one or more deviations from the one or more emulatable aspects has occurred, the one or more emulatable aspects including at least one emulatable aspect that is an emulatable intermediate outcome associated with at least one of the one or more target outcomes as depicted in FIG. 4a. For instance, the comparing module 204 (see FIG. 2a) of the computing device 10 comparing the one or more reported aspects of the end user 4 to the one or more emulatable aspects included in the template 16 to determine whether one or more deviations from the one or more emulatable aspects has occurred, the one or more emulatable aspects including at least one emulatable aspect that is an emulatable intermediate outcome (e.g., lowering systolic blood pressure by 10 mmHg) associated with at least one of the one or more target outcomes (e.g., lowering systolic blood pressure by 30 mmHg).

Various types of end user log entries 14 may be received through operation 402 in various implementations. For example, in some implementations, operation 402 may include an operation 406 for receiving the one or more end user log entries including receiving one or more social networking entries associated with the end user as depicted in FIG. 4a. For instance, the log entry receiving module 108 including the social networking entry receiving module 110 of the computing device 10 receiving the one or more end user log entries 14 including the social networking entry receiving module 110 receiving one or more social networking entries associated with the end user 4.

In some implementations, operation 406 may further include an operation 407 for receiving the one or more end user log entries including receiving one or more blog entries associated with the end user as depicted in FIG. 4a. For instance, the log entry receiving module 108 including the blog entry receiving module 111 of the computing device 10 receiving the one or more end user log entries 14 including the blog entry receiving module 111 receiving one or more blog entries (e.g. microblog entries) associated with the end user 4.

In the same or different implementations, operation 406 may include an operation 408 for receiving the one or more end user log entries including receiving one or more status reports associated with the end user as depicted in FIG. 4a. For instance, the log entry receiving module 108 including the status report receiving module 112 of the computing device 10 receiving the one or more end user log entries 14 including the status report receiving module 112 receiving one or more status reports associated with the end user 4.

Figure 4B:
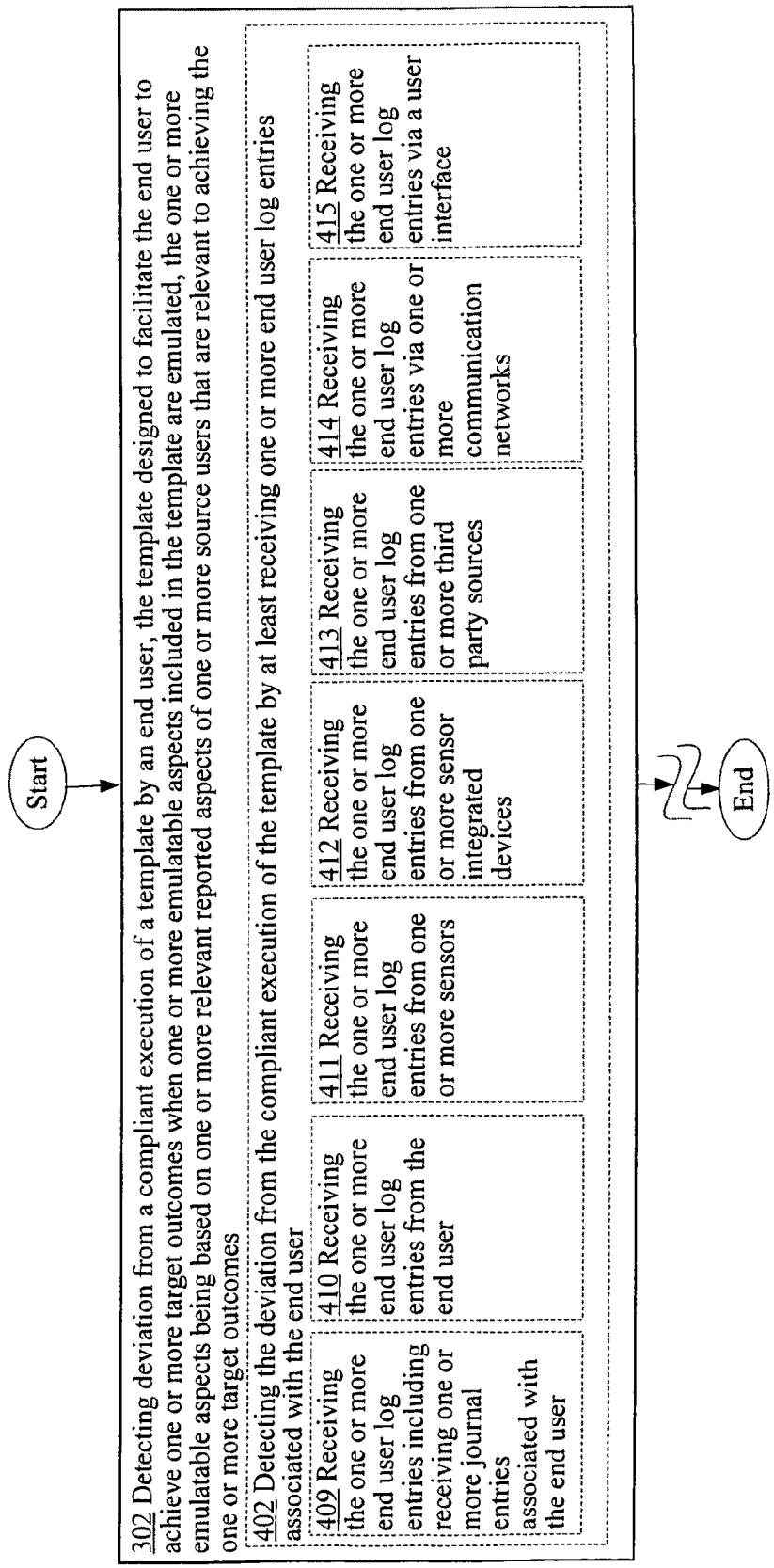
FIG. 4b is a high-level logic flowchart of a process depicting alternate implementations of the deviation detecting operation 302 of FIG. 3.

Other types of end user log entries 14 may be received through operation 402 in various alternative embodiments. For example, in some implementations, operation 402 may include an operation 409 for receiving the one or more end user log entries including receiving one or more journal entries associated with the end user as depicted in FIG. 4b. For instance, the log entry receiving module 108 including the journal entry receiving module 114 (see FIG. 1b) of the computing device 10 receiving the one or more end user log entries 14 including the journal entry receiving module 114 receiving one or more journal entries associated with the end user 4.

The one or more end user log entries 14 to be received through operation 402 may be from a variety of sources in various embodiments. For example, in some implementations, operation 402 may include an operation 410 for receiving the one or more end user log entries from the end user as depicted in FIG. 4b. For instance, the log entry receiving module 108 of the computing device 10 receiving (e.g., receiving via one or more communication networks 50 or via the user interface 120) the one or more end user log entries 14 from the end user 4.

In the same or different implementations, operation 402 may include an operation 411 for receiving the one or more end user log entries from one or more sensors as depicted in FIG. 4b. For instance, the log entry receiving module 108 including the sensor entry receiving module 115 of the computing device 10 receiving one or more end user log entries 14 from one or more sensors 240 (e.g., sensors 240 that can sense physiological characteristics of the end user 4 such as heart rate monitor, sensors 240 that can sense activities of the end user 4 such as an accelerometer, sensors 240 that can sense environmental conditions such as sensors 240 for sensing air quality, GPS, and so forth).

In the same or different implementations, operation 402 may include an operation 412 for receiving the one or more end user log entries from one or more sensor integrated devices as depicted in FIG. 4b. For instance, the log entry receiving module 108 including the sensor entry receiving module 115 of the computing device 10 receiving the one or more end user log entries 14 from one or more sensor integrated devices 40 (e.g., automobile, exercise machine, household appliance, and so forth).

In the same or different implementations, operation 402 may include an operation 413 for receiving the one or more end user log entries from one or more third party sources as depicted in FIG. 4b. For instance, the log entry receiving module 108 of the computing device 10 receiving the one or more end user log entries 14 from one or more third party sources (e.g., one or more third parties 6 such as other end users or content providers).

In the same or different implementations, operation 402 may include an operation 414 for receiving the one or more end user log entries via one or more communication networks as depicted in FIG. 4b. For instance, the log entry receiving module 108 of the computing device 10 receiving the one or more end user log entries 14 via one or more communication networks 50 (e.g., a wireless network such as WiMAX or a cellular network).

In the same or different implementations, operation 402 may include an operation 415 for receiving the one or more end user log entries via a user interface as depicted in FIG. 4b. For instance, the log entry receiving module 108 of the computing device 10 receiving the one or more end user log entries 14 via a user interface 120 (e.g., a keypad or keyboard, a touchscreen, a microphone, a mouse, and so forth).

Figure 4C:
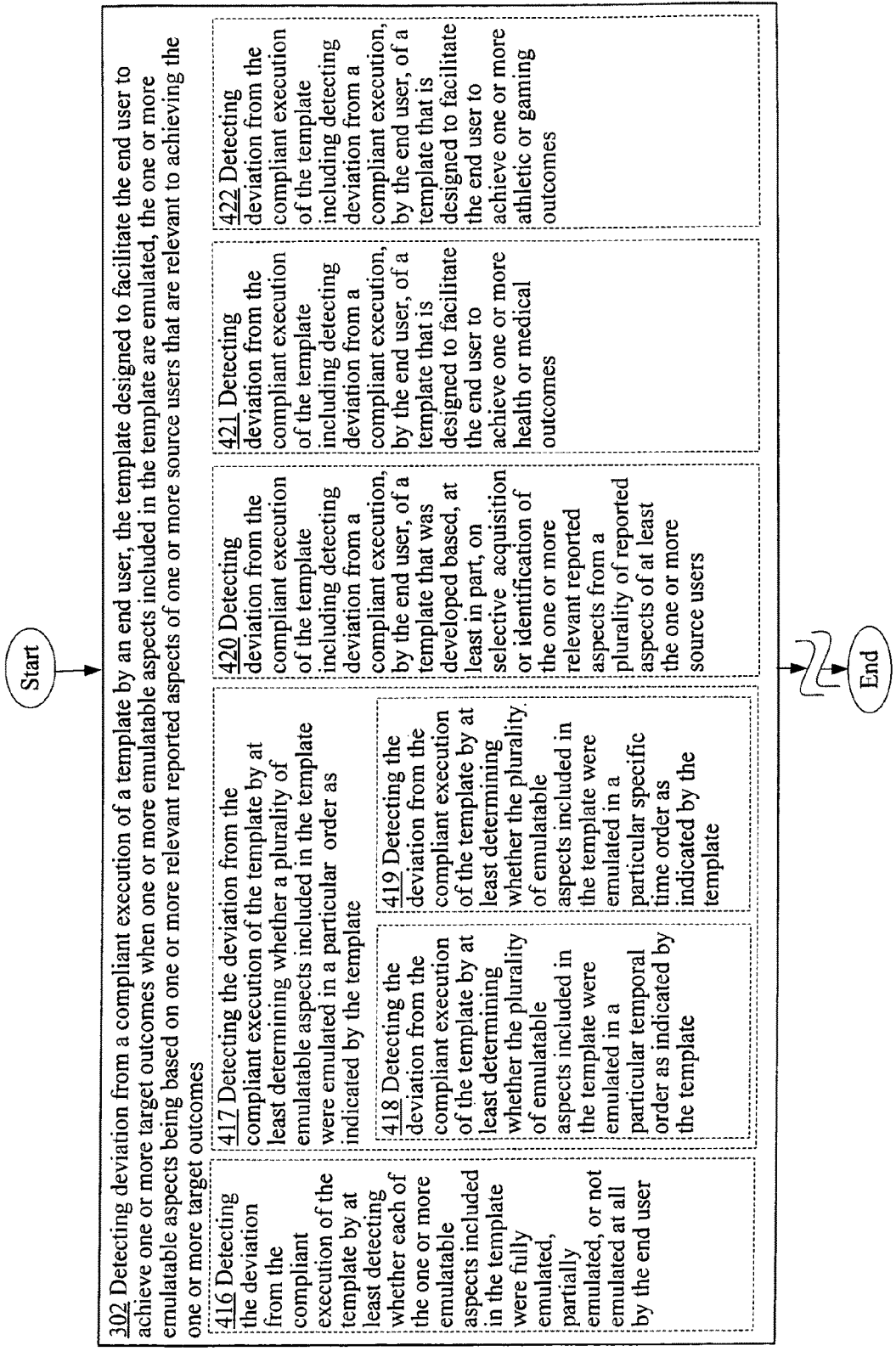
FIG. 4c is a high-level logic flowchart of a process depicting alternate implementations of the deviation detecting operation 302 of FIG. 3.

In various implementations, the deviation detecting operation 302 of FIG. 3 may include an operation 416 for detecting the deviation from the compliant execution of the template by at least detecting whether each of the one or more emulatable aspects included in the template were fully emulated, partially emulated, or not emulated at all by the end user as depicted in FIG. 4*c*. For instance, the deviation detecting module 102 of the computing device 10 detecting the deviation from the compliant execution of the template 16 by at least detecting whether each of the one or more emulatable aspects included in the template 16 were fully emulated, partially emulated, or not emulated at all by the end user 4. That is, in some cases in order to achieve a "compliant execution" of the template 16 all of the one or more emulatable aspects may need to be fully or completely emulated. In other cases, however, at least a portion of the one or more emulatable aspects included in the template 16 may be allowed to be partially emulated without deviating from the compliant execution of the template 16. In still other cases, at least a portion of the one or more emulatable aspects included in the template 16 may be allowed to be not emulated at all without deviating from the compliant execution of the template 16.

In some implementations, the deviation detecting operation 302 of FIG. 3 may include an operation 417 for detecting the deviation from the compliant execution of the template by at least determining whether a plurality of emulatable aspects included in the template were emulated in a particular order as indicated by the template as depicted in FIG. 4*c*. For instance, the deviation detecting module 102 including the order deviation determining module 206 of the computing device 10 detecting the deviation from the compliant execution of the template 16 when the order deviation determining module 206 at least determines whether a plurality of emulatable aspects included in the template 16 were emulated in a particular order as indicated by the template 16.

In some cases, operation 417 may include an operation 418 for detecting the deviation from the compliant execution of the template by at least determining whether the plurality of emulatable aspects included in the template were emulated in a particular temporal order as indicated by the template as depicted in FIG. 4*c*. For instance, the deviation detecting module 102 including the order deviation determining module 206 of the computing device 10 detecting the deviation from the compliant execution of the template 16 when the order deviation determining module 206 at least determines whether the plurality of emulatable aspects included in the template 16 were emulated in a particular temporal order as indicated by the template 16.

In some cases, operation 417 may include an operation 419 for detecting the deviation from the compliant execution of the template by at least determining whether the plurality of emulatable aspects included in the template were emulated in a particular specific time order as indicated by the template as depicted in FIG. 4*c*. For instance, the deviation detecting module 102 including the order deviation determining module 206 of the computing device 10 detecting the deviation from the compliant execution of the template 16 when the order deviation determining module 206 at least determines whether the plurality of emulatable aspects included in the template 16 were emulated in a particular specific time order as indicated by the template 16.

Various types of templates 16 may be involved in the deviation detecting operation 302 of FIG. 3. For example, in some implementations, the deviation detection operation 302 may include an operation 420 for detecting deviation from the compliant execution of the template including detecting deviation from a compliant execution, by the end user, of a template that was developed based, at least in part, on selective acquisition or identification of the one or more relevant reported aspects from a plurality of reported aspects of at least the one or more source users as depicted in FIG. 4*c*. For instance, the deviation detecting module 102 of the computing device 10 detecting deviation from the compliant execution of the template 16 including detecting deviation from a compliant execution, by the end user 4, of a template 16 that was developed based, at least in part, on selective acquisition or identification of the one or more relevant reported aspects from a plurality of reported aspects of at least the one or more source users 2*.

In some implementations, the deviation detection operation 302 may include an operation 421 for detecting deviation from the compliant execution of the template including detecting deviation from a compliant execution, by the end user, of a template that is designed to facilitate the end user to achieve one or more health or medical outcomes as depicted in FIG. 4*c*. For instance, the deviation detecting module 102 of the computing device 10 detecting deviation from the compliant execution of the template 16 including detecting deviation from a compliant execution, by the end user 4, of a template 16 that is designed to facilitate the end user 4 to achieve one or more health or medical outcomes (e.g., reduce blood glucose level, improve results of treatment for leukemia, and so forth).

In some implementations, the deviation detection operation 302 may include an operation 422 for detecting deviation from the compliant execution of the template including detecting deviation from a compliant execution, by the end user, of a template that is designed to facilitate the end user to achieve one or more athletic or gaming outcomes as depicted in FIG. 4*c*. For instance, the deviation detecting module 102 of the computing device 10 detecting deviation from the compliant execution of the template 16 including detecting deviation from a compliant execution, by the end user 4, of a template 16 that is designed to facilitate the end user 4 to achieve one or more athletic or gaming outcomes (e.g., lowering golf handicap, improve stamina, achieve a particular chess ranking, and so forth).

Figure 4D:
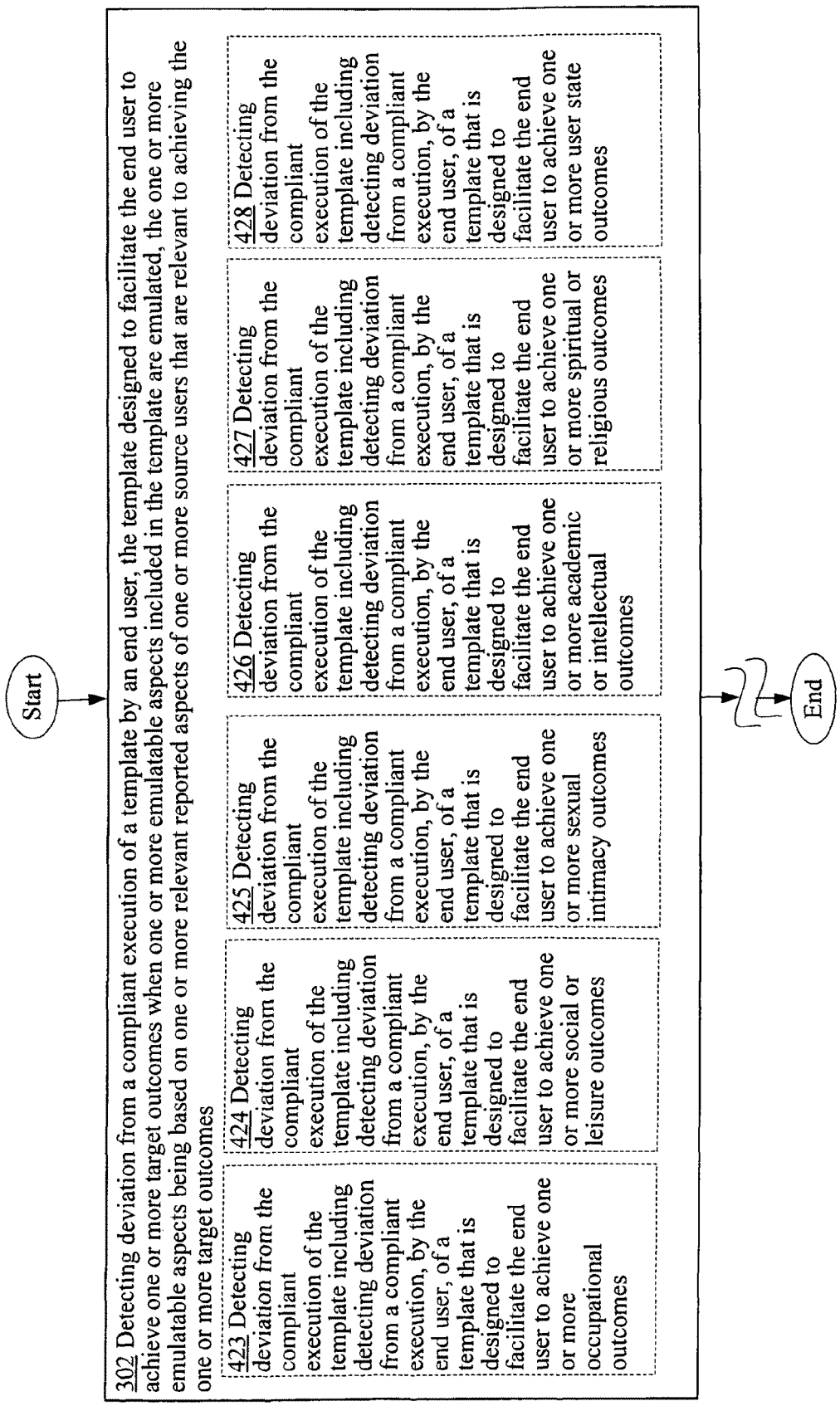
FIG. 4d is a high-level logic flowchart of a process depicting alternate implementations of the deviation detecting operation 302 of FIG. 3

In some implementations, the deviation detection operation 302 may include an operation 423 for detecting deviation from the compliant execution of the template including detecting deviation from a compliant execution, by the end user, of a template that is designed to facilitate the end user to achieve one or more occupational outcomes as depicted in FIG. 4*d*. For instance, the deviation detecting module 102 of the computing device 10 detecting deviation from the compliant execution of the template 16 including detecting deviation from a compliant execution, by the end user 4, of a template 16 that is designed to facilitate the end user 4 to achieve one or more occupational outcomes (e.g., obtain a promotion, complete a particular project on time, and so forth).

In some implementations, the deviation detection operation 302 may include an operation 424 for detecting deviation from the compliant execution of the template including detecting deviation from a compliant execution, by the end user, of a template that is designed to facilitate the end user to achieve one or more social or leisure outcomes as depicted in FIG. 4*d*. For instance, the deviation detecting module 102 of the computing device 10 detecting deviation from the compliant execution of the template 16 including detecting deviation from a compliant execution, by the end user 4, of a template 16 that is designed to facilitate the end user 4 to achieve one or more social or leisure outcomes (e.g., increase dating activities, setting aside more time or more money for vacations, and so forth).

In some implementations, the deviation detection operation 302 may include an operation 425 for detecting deviation from the compliant execution of the template including detecting deviation from a compliant execution, by the end user, of a template that is designed to facilitate the end user to achieve one or more sexual intimacy outcomes as depicted in FIG. 4d. For instance, the deviation detecting module 102 of the computing device 10 detecting deviation from the compliant execution of the template 16 including detecting deviation from a compliant execution, by the end user 4, of a template 16 that is designed to facilitate the end user 4 to achieve one or more sexual intimacy outcomes (e.g., improve frequency and length of sexual intimacy activities).

In some implementations, the deviation detection operation 302 may include an operation 426 for detecting deviation from the compliant execution of the template including detecting deviation from a compliant execution, by the end user, of a template that is designed to facilitate the end user to achieve one or more academic or intellectual outcomes as depicted in FIG. 4d. For instance, the deviation detecting module 102 of the computing device 10 detecting deviation from the compliant execution of the template 16 including detecting deviation from a compliant execution, by the end user 4, of a template 16 that is designed to facilitate the end user 4 to achieve one or more academic or intellectual outcomes (e.g., being accepted into a particular University, achieving a particular grade point average, and so forth).

In some implementations, the deviation detection operation 302 may include an operation 427 for detecting deviation from the compliant execution of the template including detecting deviation from a compliant execution, by the end user, of a template that is designed to facilitate the end user to achieve one or more spiritual or religious outcomes as depicted in FIG. 4d. For instance, the deviation detecting module 102 of the computing device 10 detecting deviation from the compliant execution of the template 16 including detecting deviation from a compliant execution, by the end user 4, of a template 16 that is designed to facilitate the end user 4 to achieve one or more spiritual or religious outcomes (e.g., achieve spiritual harmony, acceptance to a particular church or religion, and so forth).

In some implementations, the deviation detection operation 302 may include an operation 428 for detecting deviation from the compliant execution of the template including detecting deviation from a compliant execution, by the end user, of a template that is designed to facilitate the end user to achieve one or more user state outcomes as depicted in FIG. 4d. For instance, the deviation detecting module 102 of the computing device 10 detecting deviation from the compliant execution of the template 16 including detecting deviation from a compliant execution, by the end user 4, of a template 16 that is designed to facilitate the end user 4 to achieve one or more user state outcomes (e.g., achieve certain subjective user states such as being "happy" or "content," achieve certain social states such as being married, and so forth).

Figure 5A:
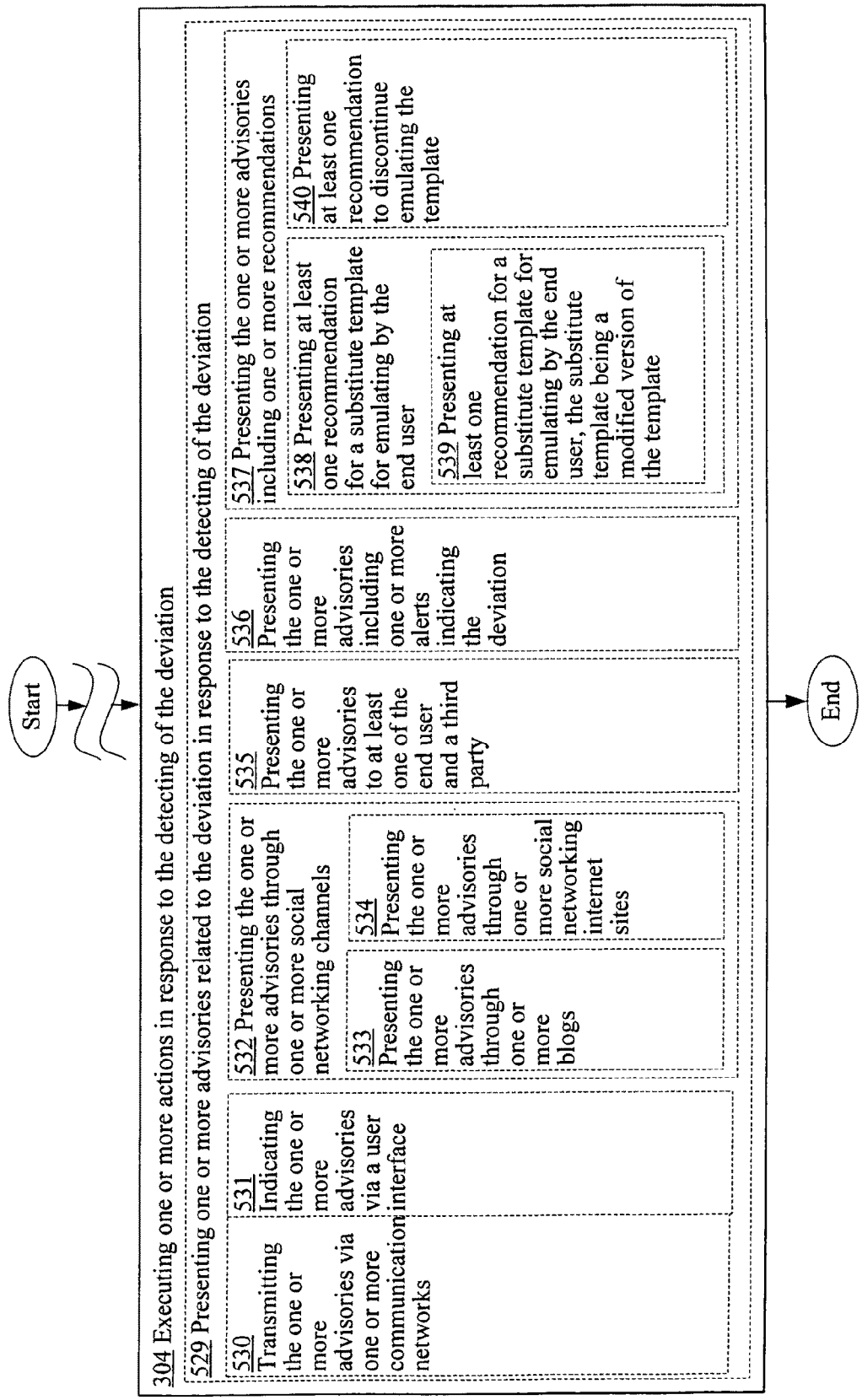
FIG. 5a is a high-level logic flowchart of a process depicting alternate implementations of the particular action executing operation 304 of FIG. 3.

Referring back to FIG. 3, the action executing operation 304 may be implemented in a number of different ways in various implementations. For example, in some implementations, the action executing operation 304 of FIG. 3 may include an operation 529 for presenting one or more advisories related to the deviation in response to the detecting of the deviation as depicted in FIG. 5a. For instance, the advisory presenting module 208 (see FIG. 2b) of the computing device 10 presenting one or more advisories 18 related to the deviation in response to the detecting of the deviation.

In various implementations, various types of advisories 18 may be presented in various alternative ways. For example, in some implementations, operation 529 may include an operation 530 for transmitting the one or more advisories via one or more communication networks as depicted in FIG. 5a. For instance, the network transmitting module 210 (see FIG. 2b) of the computing device 10 transmitting the one or more advisories 18 via one or more communication networks 50.

In the same or different implementations, operation 529 may include an operation 531 for indicating the one or more advisories via a user interface as depicted in FIG. 5a. For instance, the user interface indicating module 212 (see FIG. 2b) of the computing device 10 indicating the one or more advisories 18 via a user interface 120.

In the same or different implementations, operation 529 may include an operation 532 for presenting the one or more advisories through one or more social networking channels as depicted in FIG. 5a. For instance, the advisory presenting module 208 of the computing device 10 presenting the one or more advisories 18 through one or more social networking channels.

Various types of social networking channels may be employed in order to present the one or more advisories 18. For example, in some implementations, operation 532 may include an operation 533 for presenting the one or more advisories through one or more blogs as depicted in FIG. 5a. For instance, the advisory presenting module 208 of the computing device 10 presenting the one or more advisories 18 through one or more blogs (e.g., microblogs).

In the same or different implementations, operation 532 may include an operation 534 for presenting the one or more advisories through one or more social networking internet sites as depicted in FIG. 5a. For instance, the advisory presenting module 208 of the computing device 10 presenting the one or more advisories 18 through one or more social networking internet sites.

In some implementations, operation 529 for presenting the one or more advisories may include an operation 535 for presenting the one or more advisories to at least one of the end user and a third party as depicted in FIG. 5a. For instance, the advisory presenting module 208 of the computing device 10 presenting the one or more advisories 18 to at least one of the end user 4 and a third party 6 (e.g., another end user 4).

In the same or different implementations, operation 529 may include an operation 536 for presenting the one or more advisories including one or more alerts indicating the deviation as depicted in FIG. 5a. For instance, the advisory presenting module 208 of the computing device 10 presenting the one or more advisories 18 including one or more alerts indicating the deviation.

In the same or different implementations, operation 529 may include an operation 537 for presenting the one or more advisories including one or more recommendations as depicted in FIG. 5a. For instance, the recommendation presenting module 214 (see FIG. 2b) of the computing device 10 presenting the one or more advisories 18 including one or more recommendations (e.g., recommendation for a future course of action).

In some implementations, operation 537 may further include an operation 538 for presenting at least one recommendation for a substitute template for emulating by the end user as depicted in FIG. 5a. For instance, the recommendation presenting module 214 of the computing device 10 presenting at least one recommendation for a substitute template for emulating by the end user 4. In various implementations, a substitute template may be a modified version of the template 16 or may be an alternative template 17 (e.g., a an alternative template 17 that is completely new or unrelated to the "original" template 16). Note that in FIGS. 1a and 1b, the modified/alternative template[s] 17 represents a modified version of the template 16 and/or an alternative template 17.

Operation 538 may, in turn, further include an operation 539 for presenting at least one recommendation for a substitute template for emulating by the end user, the substitute template being a modified version of the template as depicted in FIG. 5a. For instance, the recommendation presenting module 214 of the computing device 10 presenting at least one recommendation for a substitute template 16 for emulating by the end user 4, the substitute template 16 being a modified version of the template 16 (e.g., modified/alternative template 17).

In some implementations, operation 537 for presenting one or more recommendations may include an operation 540 for presenting at least one recommendation to discontinue emulating the template as depicted in FIG. 5a. For instance, the recommendation presenting module 214 of the computing device 10 presenting at least one recommendation to discontinue emulating the template 16.

Figure 5B:
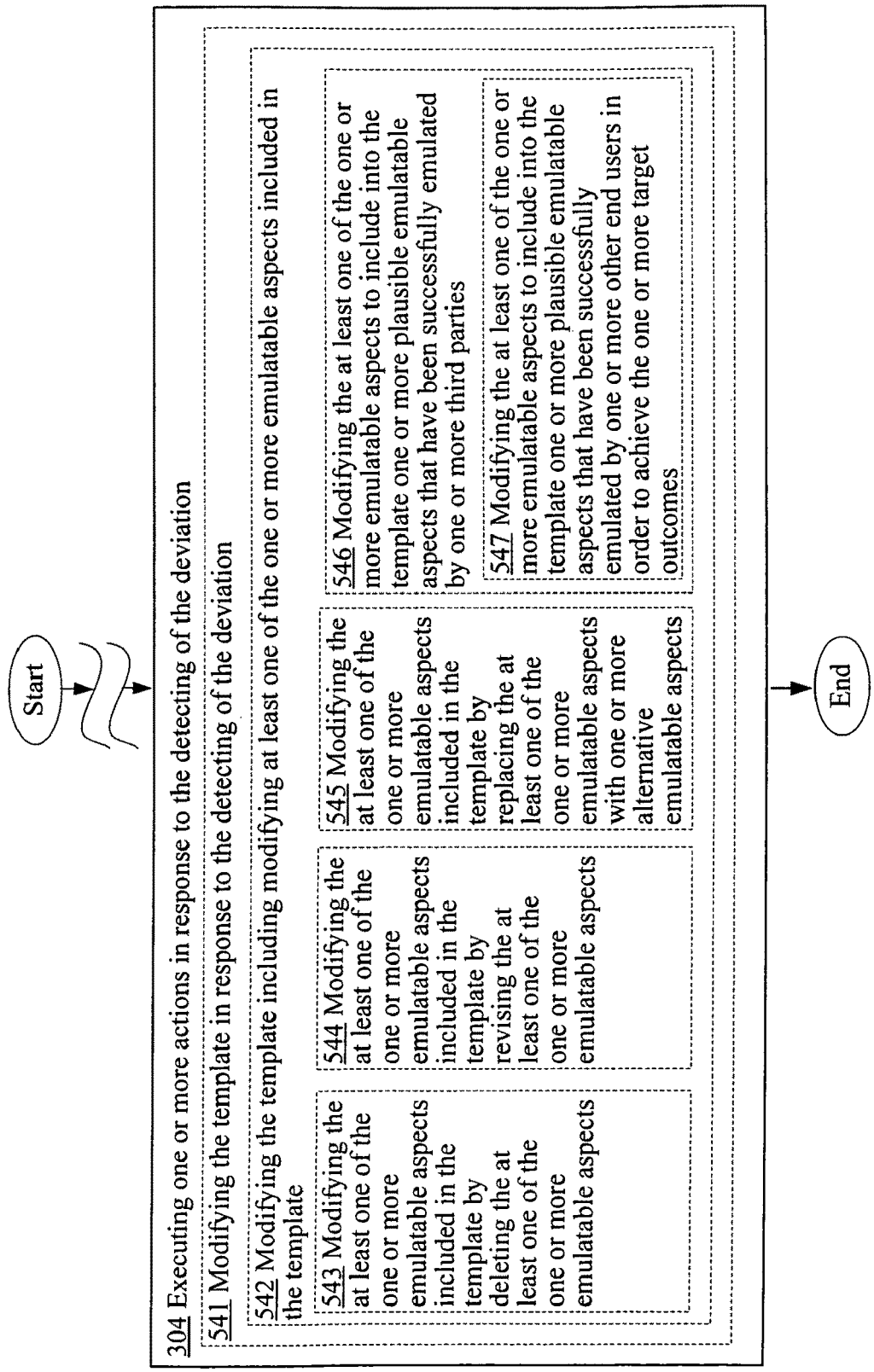
FIG. 5b is a high-level logic flowchart of a process depicting alternate implementations of the particular action executing operation 304 of FIG. 3.

In various implementations, the one or more actions executed in the action executing operation 304 of FIG. 3 may include at least one action to modify the template 16. For example, in some implementations, the action executing operation 304 may include an operation 541 for modifying the template in response to the detecting of the deviation as depicted in FIG. 5b. For instance, the template modifying module 216 (see FIG. 2b) of the computing device 10 modifying the template 16 in response to the detecting of the deviation.

Clearly, there are many ways that the template 16 may be modified. For example, in some implementations, operation 541 may include an operation 542 for modifying the template including modifying at least one of the one or more emulatable aspects included in the template as depicted in FIG. 5b. For instance, the template modifying module 216 including the emulatable aspect modifying module 218 (see FIG. 2b) of the computing device 10 modifying the template 16 including the emulatable aspect modifying module 218 modifying at least one of the one or more emulatable aspects included in the template 16.

Operation 542 for modifying one or more emulatable aspects included in the template 16 may further include one or more additional operations in various implementations. For example, in some implementations, operation 542 may include an operation 543 for modifying the at least one of the one or more emulatable aspects included in the template by deleting the at least one of the one or more emulatable aspects as depicted in FIG. 5b. For instance, the emulatable aspect modifying module 218 including the emulatable aspect deleting module 220 modifying the at least one of the one or more emulatable aspects included in the template 16 by having the emulatable aspect deleting module 220 delete the at least one of the one or more emulatable aspects.

In the same or different implementations, operation 542 may include an operation 544 for modifying the at least one of the one or more emulatable aspects included in the template by revising the at least one of the one or more emulatable aspects as depicted in FIG. 5b. For instance, the emulatable aspect modifying module 218 including the emulatable aspect revising module 222 modifying the at least one of the one or more emulatable aspects included in the template 16 by having the emulatable aspect revising module 222 revise (e.g., edit) the at least one of the one or more emulatable aspects.

In the same or different implementations, operation 542 may include an operation 545 for modifying the at least one of the one or more emulatable aspects included in the template by replacing the at least one of the one or more emulatable aspects with one or more alternative emulatable aspects as depicted in FIG. 5b. For instance, the emulatable aspect modifying module 218 including the emulatable aspect replacing module 224 modifying the at least one of the one or more emulatable aspects included in the template 16 by having the emulatable aspect replacing module 224 replace the at least one of the one or more emulatable aspects with one or more alternative emulatable aspects.

In the same or different implementations, operation 542 may include an operation 546 for modifying the at least one of the one or more emulatable aspects to include into the template one or more plausible emulatable aspects that have been successfully emulated by one or more third parties as depicted in FIG. 5b. For instance, the emulatable aspect modifying module 218 of the computing device 10 modifying the at least one of the one or more emulatable aspects to include into the template 16 one or more plausible emulatable aspects that have been successfully emulated by one or more third parties 6 (e.g., another end user 4).

In some cases, 546 may, in turn, include an operation 547 for modifying the at least one of the one or more emulatable aspects to include into the template one or more plausible emulatable aspects that have been successfully emulated by one or more other end users in order to achieve the one or more target outcomes as depicted in FIG. 5b. For instance, the emulatable aspect modifying module 218 of the computing device 10 modifying the at least one of the one or more emulatable aspects to include into the template 16 one or more plausible emulatable aspects that have been successfully emulated by one or more other end users 4 in order to achieve the one or more target outcomes.

Figure 5C:
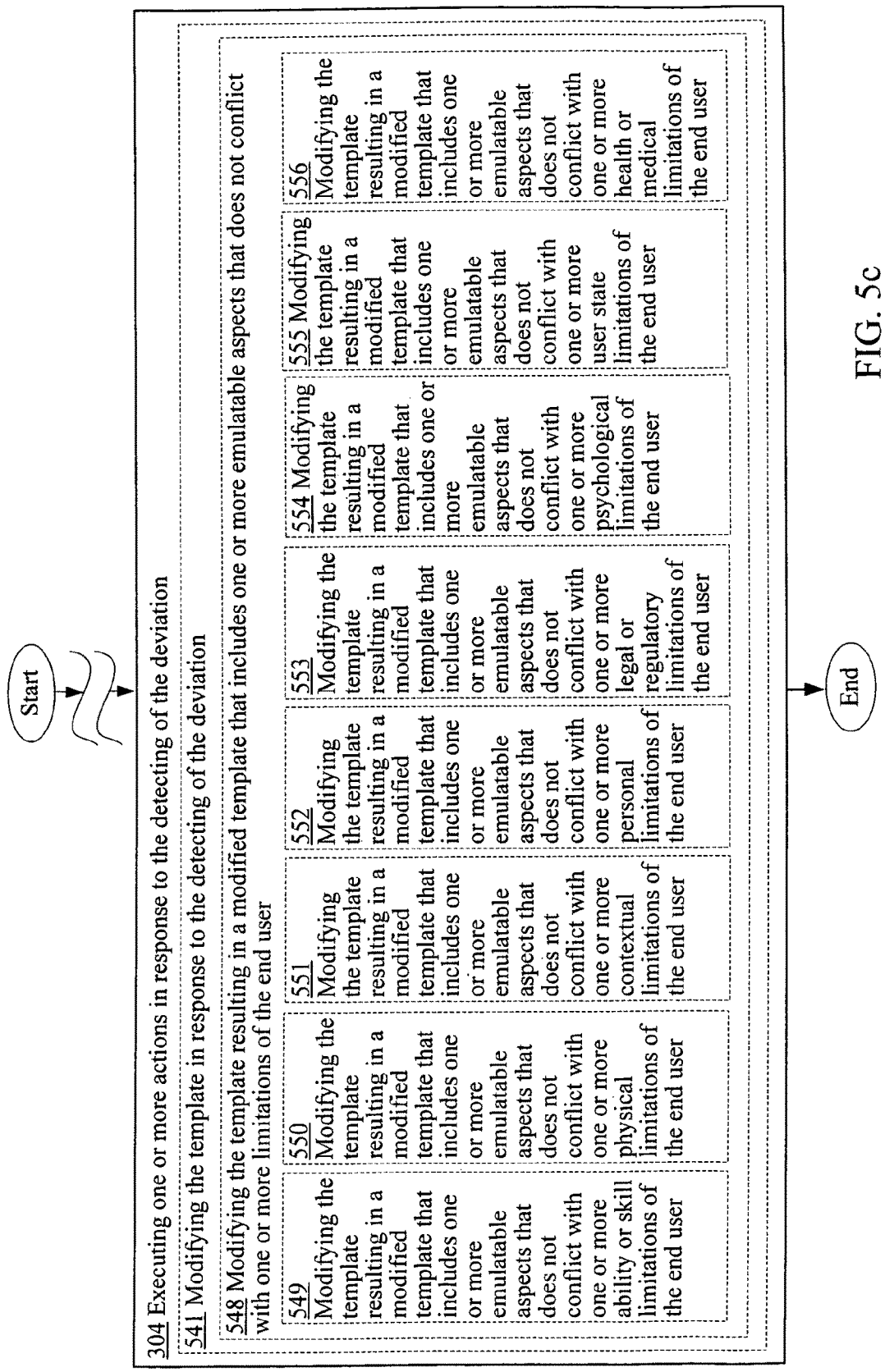
FIG. 5c is a high-level logic flowchart of a process depicting alternate implementations of the particular action executing operation 304 of FIG. 3.

In various implementations, the operation 541 to modify the template 16 may include an operation 548 for modifying the template resulting in a modified template that includes one or more emulatable aspects that does not conflict with one or more limitations of the end user as depicted in FIG. 5c. For instance, the template modifying module 216 of the computing device 10 modifying the template 16 resulting in a modified template (e.g., modified/alternative template 17 of FIGS. 1a and 1b) that includes one or more emulatable aspects that does not conflict with one or more limitations (e.g., dietary or religious limitations) of the end user 4. In other words, to modify the template 16 without violating any limitations associated with the end user 4.

This may mean that in some implementations, operation 548 may include an operation 549 for modifying the template resulting in a modified template that includes one or more emulatable aspects that does not conflict with one or more ability or skill limitations of the end user as depicted in FIG. 5c. For instance, the template modifying module 216 of the computing device 10 modifying the template 16 resulting in a modified template 17 that includes one or more emulatable aspects that does not conflict with one or more ability or skill limitations of the end user 4 (e.g., does not know how to use a spreadsheet or does not know how to swim).

In the same or different implementations, operation 548 may include an operation 550 for modifying the template resulting in a modified template that includes one or more emulatable aspects that does not conflict with one or more physical limitations of the end user as depicted in FIG. 5c. For instance, the template modifying module 216 of the computing device 10 modifying the template 16 resulting in a modified template 17 that includes one or more emulatable aspects that does not conflict with one or more physical limitations (e.g., having severe arthritis) of the end user 4.

In the same or different implementations, operation 548 may include an operation 551 for modifying the template resulting in a modified template that includes one or more emulatable aspects that does not conflict with one or more contextual limitations of the end user as depicted in FIG. 5c. For instance, the template modifying module 216 of the computing device 10 modifying the template 16 resulting in a modified template (e.g., modified/alternative template 17 of FIGS. 1a and 1b) that includes one or more emulatable aspects that does not conflict with one or more contextual limitations (e.g., logistical limitations such as unavailability of personal transportation vehicle) of the end user 4.

In the same or different implementations, operation 548 may include an operation 552 for modifying the template resulting in a modified template that includes one or more emulatable aspects that does not conflict with one or more personal limitations of the end user as depicted in FIG. 5c. For instance, the template modifying module 216 of the computing device 10 modifying the template 16 resulting in a modified template 17 that includes one or more emulatable aspects that does not conflict with one or more personal limitations (e.g., disdain for certain ethnic foods) of the end user 4.

In the same or different implementations, operation 548 may include an operation 553 for modifying the template resulting in a modified template that includes one or more emulatable aspects that does not conflict with one or more legal or regulatory limitations of the end user as depicted in FIG. 5c. For instance, the template modifying module 216 of the computing device 10 modifying the template 16 resulting in a modified template 17 that includes one or more emulatable aspects that does not conflict with one or more legal or regulatory limitations (e.g., local drug regulations) of the end user 4.

In the same or different implementations, operation 548 may include an operation 554 for modifying the template resulting in a modified template that includes one or more emulatable aspects that does not conflict with one or more psychological limitations of the end user as depicted in FIG. 5c. For instance, the template modifying module 216 of the computing device 10 modifying the template 16 resulting in a modified template 17 that includes one or more emulatable aspects that does not conflict with one or more psychological limitations (e.g., phobias) of the end user 4.

In the same or different implementations, operation 548 may include an operation 555 for modifying the template resulting in a modified template that includes one or more emulatable aspects that does not conflict with one or more user state limitations of the end user as depicted in FIG. 5c. For instance, the template modifying module 216 of the computing device 10 modifying the template 16 resulting in a modified template 17 that includes one or more emulatable aspects that does not conflict with one or more user state limitations (e.g., married or fatigued) of the end user 4.

In the same or different implementations, operation 548 may include an operation 556 for modifying the template resulting in a modified template that includes one or more emulatable aspects that does not conflict with one or more health or medical limitations of the end user as depicted in FIG. 5c. For instance, the template modifying module 216 of the computing device 10 modifying the template 16 resulting in a modified template 17 that includes one or more emulatable aspects that does not conflict with one or more health or medical limitations (e.g., lactose intolerant, defective heart, and so forth) of the end user 4.

Figure 5D:
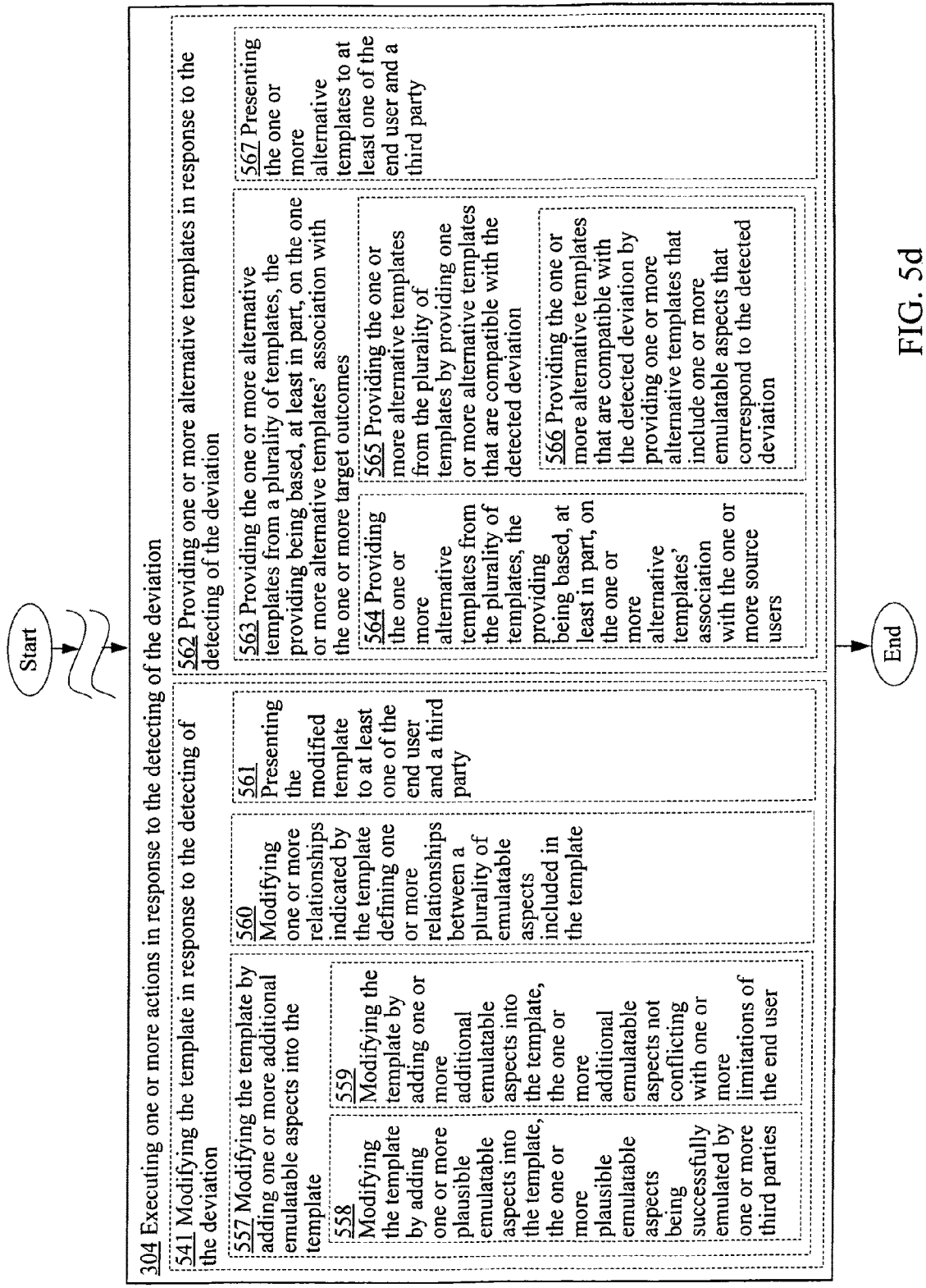
FIG. 5d is a high-level logic flowchart of a process depicting alternate implementations of the particular action executing operation 304 of FIG. 3.

In some implementations, the operation 541 for modifying the template 16 may include an operation 557 for modifying the template by adding one or more additional emulatable aspects into the template as depicted in FIG. 5d. For instance, the template modifying module 216 including the emulatable aspect adding module 226 of the computing device 10 modifying the template 16 when the emulatable aspect adding module 226 adds one or more additional emulatable aspects into the template 16.

In some implementations, operation 557 may include an operation 558 for modifying the template by adding one or more plausible emulatable aspects into the template, the one or more plausible emulatable aspects being successfully emulated by one or more third parties as depicted in FIG. 5d. For instance, the template modifying module 216 including the plausible emulatable aspect adding module 228 of the computing device 10 modifying the template 16 when the plausible emulatable aspect adding module 228 adds one or more plausible emulatable aspects into the template 16, the one or more plausible emulatable aspects being successfully emulated by one or more third parties 6.

In the same or different implementations, operation 557 may include an operation 559 for modifying the template by adding one or more additional emulatable aspects into the template, the one or more additional emulatable aspects not conflicting with one or more limitations of the end user as depicted in FIG. 5d. For instance, the template modifying module 216 including the non-conflicting emulatable aspect adding module 230 of the computing device 10 modifying the template 16 when the non-conflicting emulatable aspect adding module 230 adds one or more additional emulatable aspects into the template 16, the one or more additional emulatable aspects not conflicting with one or more limitations of the end user 4.

In various implementations, the operation 541 for modifying the template 16 may include an operation 560 for modifying one or more relationships indicated by the template defining one or more relationships between a plurality of emulatable aspects included in the template as depicted in FIG. 5d. For instance, the relationship modifying module 232 (see FIG. 2b) of the computing device 10 modifying one or more relationships indicated by the template 16 that defines one or more relationships (e.g., temporal, specific time, and/or spatial relationships) between a plurality of emulatable aspects included in the template 16.

In the same or different implementations, operation 541 may include an operation 561 for presenting the modified template to at least one of the end user and a third party as depicted in FIG. 5d. For instance, the modified template presenting module 234 of the computing device 10 presenting (e.g., transmitting via communication network 50 or indicating via a user interface 120) the modified template 17 to at least one of the end user 4 and a third party 6.

Referring back to the action executing operation 304 of FIG. 3, in various embodiments, the action executing operation 304 may include an operation 562 for providing one or more alternative templates in response to the detecting of the deviation as depicted in FIG. 5d. For instance, the alternative template providing module 236 (see FIG. 2b) of the computing device 10 providing (e.g., identifying or retrieving) one or more alternative templates (e.g., modified/alternative template 17 of FIGS. 1a and 1b) in response to the detecting of the deviation. Note that as described here an alternative template 17, with the exception of having common target outcomes, may be completely unrelated to the template 16. In other words, an alternative template 17 is not the modified version of the template 16.

In various implementations, operation 562 may further include an operation 563 for providing the one or more alternative templates from a plurality of templates, the providing being based, at least in part, on the one or more alternative templates' association with the one or more target outcomes as depicted in FIG. 5*d*. For instance, the alternative template providing module 236 of the computing device 10 providing the one or more alternative templates 17 from a plurality of templates, the providing being based, at least in part, on the association of the one or more alternative templates with the one or more target outcomes. Note that the plurality of templates may be stored in a memory 116 and/or located at one or more network sites (e.g., local source user devices 20*, network servers 60, and so forth) of one or more communication networks 50.

In some implementations, operation 563 may include an operation 564 for providing the one or more alternative templates from the plurality of templates, the providing being based, at least in part, on the one or more alternative templates' association with the one or more source users as depicted in FIG. 5*d*. For instance, the alternative template providing module 236 of the computing device 10 providing the one or more alternative templates 17 from a plurality of templates, the providing being based, at least in part, on the association of the one or more alternative templates 17 with the one or more source users 2*.

In the same or different implementations, operation 563 may include an operation 565 for providing the one or more alternative templates from the plurality of templates by providing one or more alternative templates that are compatible with the detected deviation as depicted in FIG. 5*d*. For instance, the alternative template providing module 236 of the computing device 10 providing the one or more alternative templates 17 from a plurality of templates by providing one or more alternative templates 17 that are compatible with the detected deviation. In other words, providing alternative templates 17 that will still result in the one or more target outcomes being achieved even with the occurrence of the deviation so long as the alternative templates 17 are compliantly emulated.

In some cases, operation 365 may further include an operation 566 for providing the one or more alternative templates that are compatible with the detected deviation by providing one or more alternative templates that include one or more emulatable aspects that correspond to the detected deviation as depicted in FIG. 5*d*. For instance, the alternative template providing module 236 of the computing device 10 providing the one or more alternative templates 17 that are compatible with the detected deviation by providing one or more alternative templates 17 that include one or more emulatable aspects that correspond to the detected deviation. In other words, one way to find alternative templates 17 is to find those that already include the detected deviation as one of their emulatable aspects. For example, if the detected deviation was to swim rather than jog as required by the template 16, then an alternative template 17 that is designed to achieve the same one or more target outcomes and that include at least an emulatable aspect that requires swimming may be provided.

In various implementations, the operation 562 for providing the one or more alternative templates 17 may include an operation 567 for presenting the one or more alternative templates to at least one of the end user and a third party as depicted in FIG. 5*d*. For instance, the alternative template presenting module 238 (see FIG. 2*b*) of the computing device 10 presenting the one or more alternative templates 17 to at least one of the end user 4 and a third party 6.

Figure 6:
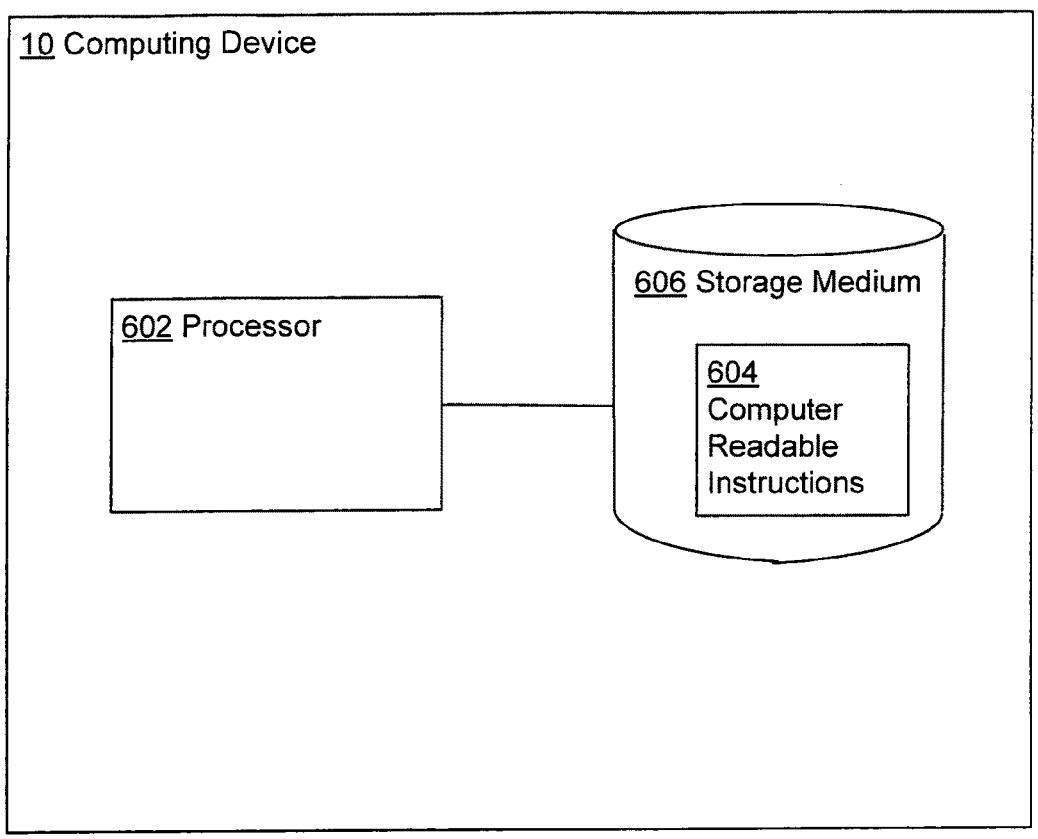
FIG. 6 is another high-level block diagram showing one implementation of the computing device 10 of FIG. 1b.

Turning now to FIG. 6, which is a high-level block diagram illustrating a particular implementation of the computing device 10 of FIG. 1*b*. As illustrated, the computing device 10 may include a processor 602 (e.g., microprocessor, controller, and so forth) coupled to storage medium 606 (e.g., volatile or non-volatile memory). The storage medium 606 may store computer readable instructions 604 (e.g., computer program product). The processor 602, in various implementations, may execute the computer readable instructions 604 in order to execute one or more operations described above and as illustrated in FIGS. 3, 4*a*, 4*b*, 4*c*, 4*d*, 5*a*, 5*b*, 5*c*, and 5*d*.

For example, the processor 602 may execute the computer readable instructions 604 in order to detect deviation from a compliant execution of a template 16 by an end user 4, the template 16 designed to facilitate the end user 4 to achieve one or more target outcomes when one or more emulatable aspects included in the template 16 are compliantly emulated, the one or more emulatable aspects being based on one or more relevant reported aspects of one or more source users 2* that are relevant to achieving the one or more target outcomes; and/or to execute one or more actions in response to the detecting of the deviation as illustrated by the operational flow 300 of FIG. 3.

Those having skill in the art will recognize that the state of the art has progressed to the point where there is little distinction left between hardware and software implementations of aspects of systems; the use of hardware or software, is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:
   a deviation detecting module configured to detect deviation from a compliant execution by an end user of a template that includes one or more emulatable aspects, the one or more emulatable aspects being based on one or more relevant reported aspects of one or more source users relevant to achieving one or more target outcomes, the template designed to facilitate the end user to achieve the one or more target outcomes when the one or more emulatable aspects included in the template are emulated; and
   an action execution module configured to execute, in response to the detecting of the deviation, one or more actions, wherein said action execution module, comprises:
      a template modifying module configured to modify the template in response to the detecting of the deviation, wherein said template modifying module, comprises:
         an emulatable aspect modifying module configured to modify at least one of the one or more emulatable aspects included in the template, wherein said emulatable aspect modifying module, comprises:
            an emulatable aspect modifying module configured to modify the at least one of the one or more emulatable aspects to include into the template one or more plausible emulatable aspects that have been successfully emulated by one or more third parties.

2. The system of claim 1, further comprising:
   a log entry receiving module configured to at least receive one or more end user log entries associated with the end user to facilitate the detection of the deviation from the compliant execution of the template.

3. The system of claim 2, wherein said deviation detecting module, comprises:
   a log entry monitoring module configured to monitor the one or more received end user log entries to detect deviation from the one or more emulatable aspects included in the template, the one or more received end user log entries indicating one or more reported aspects of the end user.

4. The system of claim 3, wherein said log entry monitoring module, comprises:
   a comparing module configured to determine whether one or more deviations from the one or more emulatable aspects have occurred by comparing the one or more reported aspects of the end user to the one or more emulatable aspects included in the template.

5. The system of claim 4, wherein said comparing module, comprises:
   a comparing module configured to determine whether one or more deviations from the one or more emulatable aspects included in the template has occurred by comparing the one or more reported aspects of the end user to the one or more emulatable aspects, the one or more emulatable aspects including at least one emulatable aspect that is an emulatable intermediate outcome associated with at least one of the one or more target outcomes.

6. The system of claim 2, wherein said log entry receiving module, comprises:
   a social networking entry receiving module configured to receive one or more social networking entries associated with the end user.

7. The system of claim 6, wherein said social networking entry receiving module, comprises:
   a blog entry receiving module configured to receive one or more blog entries associated with the end user.

8. The system of claim 6, wherein said social networking entry receiving module, comprises:
   a status report receiving module configured to receive one or more status reports associated with the end user.

9. The system of claim 2, wherein said log entry receiving module, comprises:
   a log entry receiving module configured to receive from the end user the one or more end user log entries.

10. The system of claim 2, wherein said log entry receiving module, comprises:
    a sensor entry receiving module configured to receive from one or more sensors the one or more end user log entries.

11. The system of claim 2, wherein said log entry receiving module, comprises:
    a log entry receiving module including sensor entry receiving module configured to receive from one or more sensor integrated devices the one or more end user log entries.

12. The system of claim 2, wherein said log entry receiving module, comprises:
    a log entry receiving module configured to receive from one or more third party sources the one or more end user log entries.

13. The system of claim 1, wherein said deviation detecting module, comprises:
    a deviation detecting module configured to at least detect whether each of the one or more emulatable aspects included in the template were fully emulated, partially emulated, or not emulated at all by the end user in order to detect the deviation from the compliant execution of the template.

14. The system of claim 1, wherein said deviation detecting module, comprises:
    an order deviation determining module configured to at least determine whether a plurality of emulatable aspects included in the template were emulated in a particular order as indicated by the template in order to facilitate the detection of the deviation from the compliant execution of the template.

15. The system of claim 14, wherein said order deviation determining module, comprises:
an order deviation determining module configured to at least determine whether the plurality of emulatable aspects included in the template were emulated in a particular temporal order as indicated by the template.

16. The system of claim 14, wherein said order deviation determining module, comprises:
an order deviation determining module configured to at least determine whether the plurality of emulatable aspects included in the template were emulated in a particular specific time order as indicated by the template.

17. The system of claim 1, wherein said deviation detecting module, comprises:
a deviation detecting module configured to detect deviation from a compliant execution, by the end user, of a template that was developed based, at least in part, on selective acquisition or identification of the one or more relevant reported aspects from a plurality of reported aspects of at least the one or more source users.

18. The system of claim 1, wherein said action execution module, comprises:
an advisory presenting module configured to present, in response to the detecting of the deviation, one or more advisories related to the deviation.

19. The system of claim 18, wherein said advisory presenting module, comprises:
an advisory presenting module configured to present through one or more social networking channels the one or more advisories.

20. The system of claim 19, wherein said advisory presenting module, comprises:
an advisory presenting module configured to present through one or more blogs the one or more advisories.

21. The system of claim 19, wherein said advisory presenting module, comprises:
an advisory presenting module configured to present through one or more social networking internet sites the one or more advisories.

22. The system of claim 18, wherein said advisory presenting module, comprises:
an advisory presenting module configured to present to at least one of the end user and a third party the one or more advisories.

23. The system of claim 18, wherein said advisory presenting module, comprises:
an advisory presenting module configured to present one or more alerts indicating the deviation.

24. The system of claim 18, wherein said advisory presenting module, comprises:
a recommendation presenting module configured to present one or more recommendations.

25. The system of claim 24, wherein said recommendation presenting module, comprises:
a recommendation presenting module configured to present at least one recommendation for a substitute template for emulating by the end user.

26. The system of claim 25, wherein said recommendation presenting module, comprises:
a recommendation presenting module configured to present at least one recommendation for a substitute template for emulating by the end user, the substitute template being a modified version of the template.

27. The system of claim 24, wherein said recommendation presenting module, comprises:
a recommendation presenting module configured to present at least one recommendation to discontinue emulating the template.

28. The system of claim 1, wherein said emulatable aspect modifying module, comprises:
an emulatable aspect deleting module configured to delete the at least one of the one or more emulatable aspects.

29. The system of claim 1, wherein said emulatable aspect modifying module, comprises:
an emulatable aspect revising module configured to revise the at least one of the one or more emulatable aspects.

30. The system of claim 1, wherein said emulatable aspect modifying module comprises:
an emulatable aspect replacing module configured to replace the at least one of the one or more emulatable aspects with one or more alternative emulatable aspects.

31. The system of claim 1, wherein said emulatable aspect modifying module, comprises:
an emulatable aspect modifying module configured to modify the at least one of the one or more emulatable aspects to include into the template one or more plausible emulatable aspects that have been successfully emulated by one or more other end users in order to achieve the one or more target outcomes.

32. The system of claim 1, wherein said template modifying module, comprises:
a template modifying module configured to modify the template that results in a modified template that includes one or more emulatable aspects that does not conflict with one or more limitations of the end user.

33. The system of claim 1, wherein said template modifying module, comprises:
an emulatable aspect adding module configured to add one or more additional emulatable aspects into the template.

34. The system of claim 33, wherein said emulatable aspect adding module, comprises:
a plausible emulatable aspect adding module configured to add one or more plausible emulatable aspects into the template, the one or more plausible emulatable aspects being successfully emulated by one or more third parties.

35. The system of claim 33, wherein said emulatable aspect adding module, comprises:
a non-conflicting emulatable aspect adding module configured to add one or more additional emulatable aspects into the template, the one or more additional emulatable aspects not conflicting with one or more limitations of the end user.

36. The system of claim 1, wherein said template modifying module, comprises:
a relationship modifying module configured to modify one or more relationships as indicated by the template between a plurality of emulatable aspects included in the template.

37. The system of claim 1, wherein said template modifying module, comprises:
a modified template presenting module configured to present to at least one of the end user and a third party the modified template.

38. The system of claim 1, wherein said action execution module, comprises:
an alternative template providing module configured to provide in response to the detecting of the deviation one or more alternative templates.

39. The system of claim 38, wherein said alternative template providing module, comprises:
   an alternative template providing module configured to provide the one or more alternative templates from a plurality of templates based, at least in part, on the one or more alternative templates' association with the one or more target outcomes.

40. The system of claim 39, wherein said alternative template providing module, comprises:
   an alternative template providing module configured to provide one or more alternative templates that are compatible with the detected deviation.

41. The system of claim 40, wherein said alternative template providing module, comprises:
   an alternative template providing module configured to provide one or more alternative templates that include one or more emulatable aspects that correspond to the detected deviation.

42. The system of claim 38, wherein said alternative template providing module, comprises:
   an alternative template presenting module configured to present to at least one of the end user and a third party the one or more alternative templates.

43. A system, comprising:
   circuitry for detecting deviation from a compliant execution of a template by an end user, the template designed to facilitate the end user to achieve one or more target outcomes when one or more emulatable aspects included in the template are emulated, the one or more emulatable aspects being based on one or more relevant reported aspects of one or more source users that are relevant to achieving the one or more target outcomes; and
   circuitry for executing one or more actions in response to the detecting of the deviation, wherein said circuitry for executing one or more actions in response to the detecting of the deviation comprises:
      circuitry for modifying the template in response to the detecting of the deviation, wherein said circuitry for modifying the template in response to the detecting of the deviation, comprises:
         circuitry for modifying the template including circuitry for modifying at least one of the one or more emulatable aspects included in the template, wherein said circuitry for modifying the template including circuitry for modifying at least one of the one or more emulatable aspects included in the template, comprises:
            circuitry for modifying the at least one of the one or more emulatable aspects to include into the template one or more plausible emulatable aspects that have been successfully emulated by one or more third parties.

44. An article of manufacture, comprising:
a non-transitory storage medium bearing:
one or more instructions for detecting deviation from a compliant execution of a template by an end user, the template designed to facilitate the end user to achieve one or more target outcomes when one or more emulatable aspects included in the template are emulated, the one or more emulatable aspects being based on one or more relevant reported aspects of one or more source users that are relevant to achieving the one or more target outcomes; and
one or more instructions for executing one or more actions in response to the detecting of the deviation, wherein said one or more instructions for executing one or more actions in response to the detecting of the deviation comprises:
   one or more instructions for modifying the template in response to the detecting of the deviation, wherein said one or more instructions for modifying the template in response to the detecting of the deviation, comprises:
      one or more instructions for modifying the template including one or more instructions for modifying at least one of the one or more emulatable aspects included in the template, wherein said one or more instructions for modifying the template including one or more instructions for modifying at least one of the one or more emulatable aspects included in the template, comprises:
         one or more instructions for modifying the at least one of the one or more emulatable aspects to include into the template one or more plausible emulatable aspects that have been successfully emulated by one or more third parties.

* * * * *